(12) United States Patent
Yang

(10) Patent No.: US 12,008,899 B2
(45) Date of Patent: Jun. 11, 2024

(54) V2X COMMUNICATION DEVICE AND METHOD FOR TRANSMITTING AND RECEIVING V2X MESSAGE THEREFOR

(71) Applicant: LG Electronics Inc., Seoul (KR)

(72) Inventor: Seungryul Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 826 days.

(21) Appl. No.: 17/050,992

(22) PCT Filed: May 13, 2019

(86) PCT No.: PCT/KR2019/005757
§ 371 (c)(1),
(2) Date: Oct. 27, 2020

(87) PCT Pub. No.: WO2019/216741
PCT Pub. Date: Nov. 14, 2019

(65) Prior Publication Data
US 2022/0375344 A1    Nov. 24, 2022

(30) Foreign Application Priority Data

May 11, 2018  (KR) .......................... 10-2018-0054437

(51) Int. Cl.
*G08G 1/0967*  (2006.01)
*B60W 60/00*  (2020.01)
*H04W 4/40*  (2018.01)

(52) U.S. Cl.
CPC ..... *G08G 1/096775* (2013.01); *B60W 60/001* (2020.02); *H04W 4/40* (2018.02); *B60W 2556/45* (2020.02)

(58) Field of Classification Search
CPC .. G08G 1/096775; G08G 1/162; G08G 1/164; G08G 1/167; B60W 60/001; B60W 2556/45; H04W 4/40; H04L 65/40
See application file for complete search history.

(56) References Cited

U.S. PATENT DOCUMENTS

| | | | |
|---|---|---|---|
| 2010/0023183 A1 | 1/2010 | Huang et al. | |
| 2015/0310738 A1 | 10/2015 | Karacan et al. | |
| 2018/0257645 A1* | 9/2018 | Buburuzan | ............ G07C 5/008 |
| 2019/0329777 A1* | 10/2019 | Rajab | ................ B60W 50/0097 |

FOREIGN PATENT DOCUMENTS

| | | |
|---|---|---|
| KR | 20170090672 | 8/2017 |
| KR | 20180018454 | 2/2018 |
| KR | 20180042344 | 4/2018 |

* cited by examiner

*Primary Examiner* — Brian P Sweeney
(74) *Attorney, Agent, or Firm* — Fish & Richardson P.C.

(57) ABSTRACT

Disclosed herein is a method for managing vehicle driving by using V2X communication. More particularly, a reporting vehicle generates a driving message for reporting maneuver information of the reporting vehicle. The driving message includes the maneuver information associated with intended expected driving after a current time of the vehicle. The reporting vehicle receives a management message, as a response to the driving message, including vehicle driving management information for managing a driving operation of the reporting vehicle based on the maneuver information.

12 Claims, 28 Drawing Sheets

Geographical interval with a Single Lane Maneuver Segment
where Lane ID=1, Position::Start=Position A, Position:End=Position B.

(a)

Geographical area with a Lane Change Maneuver Segment
where Lane ID::Start=1, Lane ID::End=2, Position::Start=Position A,
Position:End=Position B.

(b)

(a)

(b)

(a)

(b)

V2X COMMUNICATION DEVICE AND METHOD FOR TRANSMITTING AND RECEIVING V2X MESSAGE THEREFOR

CROSS REFERENCE TO RELATED APPLICATION

This application is a National Stage application under 35 U.S.C. § 371 of International Application No. PCT/KR2019/005757, filed on May 13, 2019, which claims the benefit of Korean Patent Application No. 10-2018-0054437, filed on May 11, 2018. The disclosures of the prior applications are incorporated by reference in their entirety.

BACKGROUND OF THE INVENTION

Field of the Invention

The present disclosure relates to a V2X communication device and a V2X message transmission and reception method thereof, and more particularly, to a method of transmitting and receiving a message for managing driving between vehicles through driving information of a vehicle.

Description of the Related Art

Recently, vehicles have become the result of complex industrial technologies in which electrical, electronic, and communication technologies converge at the center of mechanical engineering. In this respect, vehicles are also called smart cars. Smart cars connect drivers, vehicles, and traffic infrastructure to provide a variety of customized mobility services, as well as traditional vehicle technologies such as traffic safety and complexity resolution. This connectivity can be implemented using Vehicle to Everything (V2X) communication technology.

SUMMARY OF THE INVENTION

Various services may be provided through V2X communication. For example, services related to automatic and connected driving may be provided with the goal of improving traffic safety and mobility. One such service is the CACC service, which is a technology that forms CACC pairs or CACC strings and keeps safety time gaps between vehicles to a minimum for improved traffic efficiency and reduced fuel consumption.

However, the current V2X technology can provide simple warning services, but has limitations in providing more sophisticated management services. Warning signs in dangerous situations or at dangerous moments can reduce the risk of collisions but are not the ultimate solution because they do not help avoid facing such dangerous situations or moments.

In addition, the warning service no longer tells the driver and/or the vehicle what to do at the moment of receiving an alert signal.

The technical objects of the present disclosure are not limited to the above-mentioned technical objects, and other unmentioned technical objects will become apparent to those skilled in the art from the following description.

According to an embodiment of the present disclosure, a method, performed in a reporting vehicle, for managing vehicle driving by using vehicle to everything (V2X) communication, the method comprising: generating a driving message for reporting maneuver information of the reporting vehicle to a coordinator; and receiving a management message comprising vehicle driving management information for managing a driving operation of the reporting vehicle based on the maneuver information as a response to the driving message, wherein the driving message comprises the maneuver information associated with intended expected driving after a current time of the vehicle.

According to an embodiment of the present disclosure, the maneuver information comprises at least one of specific information, geographic information, time information and dynamic information that are associated with the expected driving of the vehicle.

According to an embodiment of the present disclosure, the specific information, the geographic information, the time information and the dynamic information are collected through a maneuver collection function of a maneuver management application entity or a facility entity.

According to an embodiment of the present disclosure, a method further comprises updating the maneuver information based on the vehicle driving management information.

According to an embodiment of the present disclosure, a method further comprises performing a specific driving operation associated with the driving of the vehicle according to the driving management information.

According to an embodiment of the present disclosure, the maneuver information comprises a maneuver type indicating a type of the expected driving of the reporting vehicle and driving information associated with driving according to the maneuver type.

According to an embodiment of the present disclosure, the driving management information comprises indication information representing permission or rejection of an operation of the reporting vehicle according to the maneuver information.

According to an embodiment of the present disclosure, the vehicle driving management information comprises: a maneuver type indicating a driving type of each vehicle for optimal driving of a plurality of vehicle managed by the coordinator; and driving information associated with driving according to the maneuver type.

According to an embodiment of the present disclosure, a reporting vehicle for managing vehicle driving by using V2X communication, the vehicle comprising: a radio frequency (RF) module for transmitting and receiving a wireless signal; and a processor functionally connected to the RF module, wherein the processor is configured to: generate a driving message for reporting maneuver information of the reporting vehicle to a coordinator vehicle, and receive a management message comprising vehicle driving management information for managing a driving operation of the reporting vehicle based on the maneuver information as a response to the driving message, and wherein the driving message comprises the maneuver information associated with intended expected driving after a current time of the vehicle.

According to the present disclosure, as a warning service is provided in advance to neighboring vehicles based on the expected driving information of a vehicle, the number of situations in which vehicle-to-vehicle accidents occur may be reduced.

Also, a coordinator vehicle obtains the expected driving information of vehicles and transmits control information for optimal vehicle driving to adjacent vehicles. The vehicles, being thus controlled, may be efficiently driven.

Effects obtainable from the present disclosure are not limited to the above-mentioned effects, and other unmentioned effects may be clearly understood by those skilled in the art from the following description.

BRIEF DESCRIPTION OF THE DRAWINGS

The accompanying drawings, which are incorporated in and constitute a part of this application for further understanding of the present disclosure, illustrate embodiments of the present disclosure, together with a detailed description that illustrates the principles of the present disclosure.

DETAILED DESCRIPTION OF THE INVENTION

Preferred embodiments of the disclosure are described in detail and examples thereof are illustrated in the accompanying drawings. The following detailed description with reference to the accompanying drawings is intended to illustrate the preferred embodiments of the disclosure rather than merely illustrating embodiments that may be implemented according to embodiments of the disclosure. The following detailed description includes details in order to provide a thorough understanding of the disclosure, but the disclosure does not require all these details. In the disclosure, respective embodiments described below need not be particularly used separately. Multiple embodiments or all embodiments may be used together, and specific embodiments may be used as a combination.

Most of the terms used in the disclosure are selected from the general ones that are widely used in the field, but some terms are arbitrarily selected by the applicant and the meaning thereof will be described in detail in the following description as necessary. Accordingly, the disclosure should be understood based on the intended meaning of the term rather than the mere name or meaning of the term.

The disclosure relates to a V2X communication apparatus and the V2X communication apparatus is included in an Intelligent Transport System (ITS) to perform all or some functions of the ITS. The V2X communication apparatus may communicate with vehicles and vehicles, vehicles and infrastructure, vehicles and bicycles, and mobile devices. The V2X communication apparatus may be abbreviated as a V2X apparatus. As an embodiment, the V2X apparatus may correspond to an on board unit (OBU) of the vehicle or may be included in the OBU. The OBU may also be referred to as on a board equipment (OBE). The V2X apparatus may correspond to a road side unit (RSU) of the infrastructure or may be included in the RSU. The RSU may also be referred to as a road side equipment (RSE). Alternatively, the V2X communication apparatus may correspond to an ITS station or may be included in the ITS station. All of a predetermined OBU, a predetermined RSU, and a predetermined mobile equipment that perform V2X communication may also be referred to as the ITS station or the V2X communication apparatus.

Figure 1:
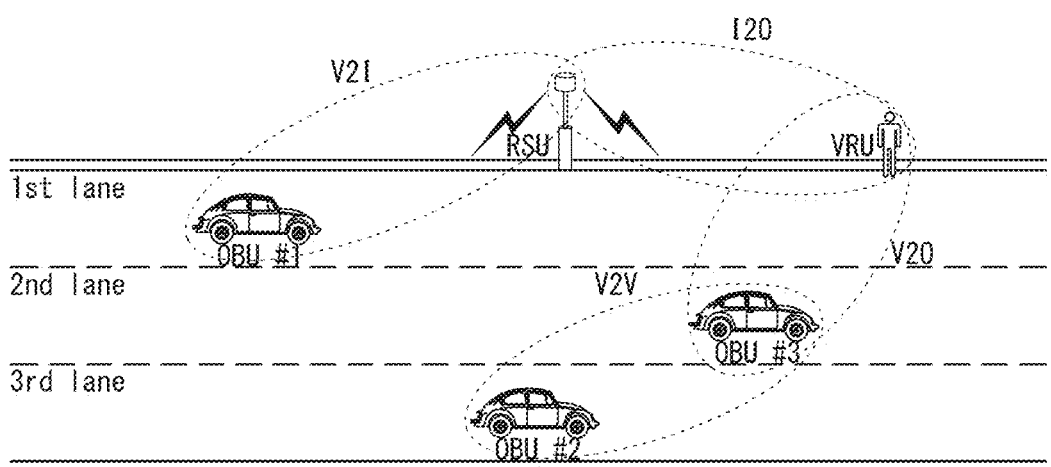
FIG. 1 illustrates an intelligent transport system (ITS) according to an embodiment of the disclosure.

FIG. 1 illustrates an intelligent transport system (ITS) according to an embodiment of the disclosure.

Intelligent transport system means a system to provide efficient and safe transport services by applying information and communication technology, such as electronic control and communication devices, to traffic facilities installed around roads, such as traffic signals or electronic road signs, and means of transportation, such as vehicles, buses, or trains. To support an ITS, vehicle to everything (V2X) technology may be used. V2X communication technology refers to technology of communication between vehicles or between a vehicle and a device around the vehicle.

A vehicle supporting V2X communication is equipped with an OBU. The OBU includes a dedicated short-range communication (DSRC) communication modem. An infra structure including V2X modules installed around a road, such as traffic signals, may be denoted an RSU. Vulnerable road users (VRU) are vulnerable users at risk in traffic, such as pedestrians, bicycles, or wheelchairs. VRUs are capable of V2X communication.

Vehicle to vehicle (V2V) denotes communication between V2X communication device-equipped vehicles or technology for such communication. Vehicle to infra-structure (V2I) denotes communication between a V2X communication device-equipped vehicle and an infrastructure or technology for such communication. Besides, communication between a vehicle and a VRU may be denoted V2O, and communication between an infrastructure and a VRU may be denoted I2O.

Figure 2:
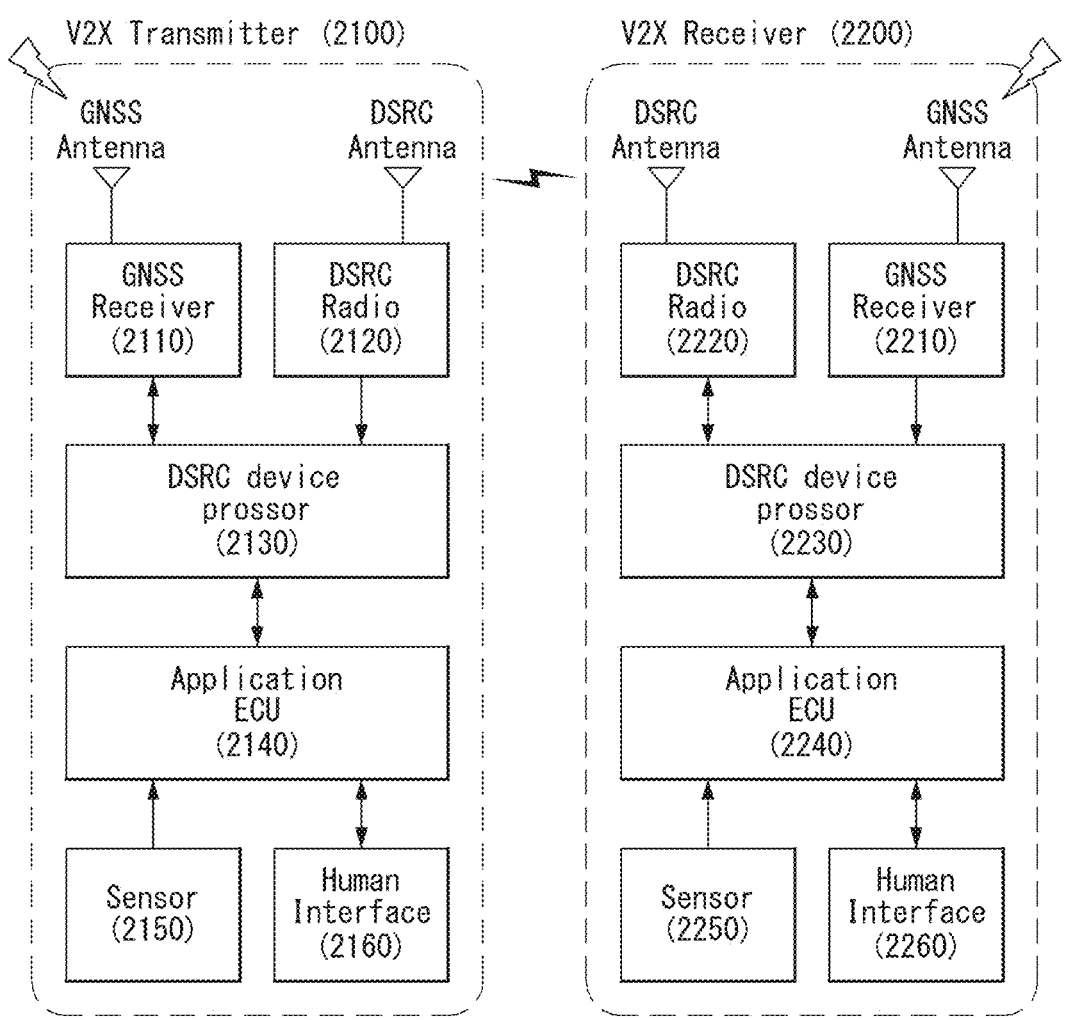
FIG. 2 illustrates a V2X transmission/reception system according to an embodiment of the disclosure.

FIG. 2 illustrates a V2X transmission/reception system according to an embodiment of the disclosure.

A V2X transmission/reception system includes a V2X transmitter 2100 and a V2X receiver 2200. The V2X transmitter 2100 and the V2X receiver 2200 are so termed depending on their role of data transmission or data reception, and no difference in device configuration exists therebetween. The V2X transmitter 2100 and the V2X receiver 2200 both correspond to a V2X communication device.

The V2X transmitter 2100 includes a global navigation satellite system (GNSS) receiver 2110, a DSRC radio 2120, a DSRC device processor 2130, an application electronic control unit (ECU) 2140, a sensor 2150, and a human interface 2160.

The DSRC radio 2120 may perform communication based on wireless local area network (WLAN)-based IEEE 802.11 standards and/or the wireless access in vehicular environments (WAVE) of the society of automotive engineers (SAE), a U.S.-based automotive professional association. The DSRC radio 2120 may perform the operations of the physical layer and the MAC layer.

The DSRC device processor 2130 may decode messages received by, or to be transmitted by, the DSRC radio 2120. The GNSS receiver 2110 may perform GNSS processing and obtain location information and time information. According to an embodiment, the GNSS receiver 2110 may be a global positioning system (GPS) device.

The application ECU 2140 may be a microprocessor for providing a specific application service. The application ECU may be operated/generate a message based on a user input and sensor information to provide a service and may transmit/receive messages using the DSRC device processor. The sensor 2150 may obtain the vehicle state and ambient sensor information. The human interface 2160 may receive user inputs or display/provide messages via an interface, such as an input button or monitor.

The V2X receiver 2200 includes a global navigation satellite system (GNSS) receiver 2210, a DSRC radio 2220, a DSRC device processor 2230, an application electronic control unit (ECU) 2240, a sensor 2250, and a human interface 2260. The above-described configuration of the V2X transmitter 2100 is applied to the configuration of the V2X receiver 2200.

The DSRC radio and the DSRC device processor correspond to an embodiment of a communication unit. The communication unit may perform communication based on cellular communication technology, such as 3GPP or long term evolution (LTE).

Figure 3:
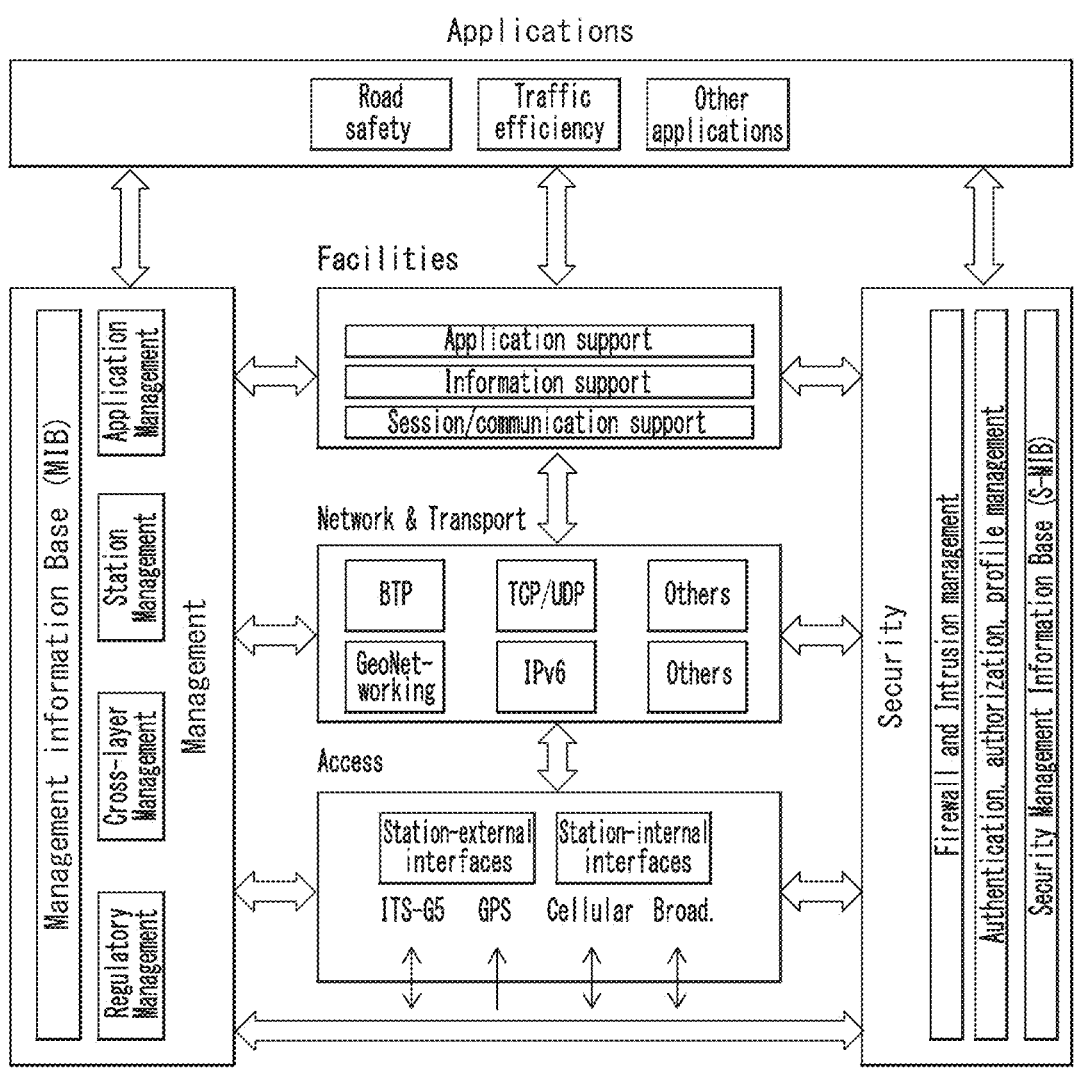
FIG. 3 illustrates a configuration of a V2X system according to an embodiment of the disclosure.

FIG. 3 illustrates a configuration of a V2X system according to an embodiment of the disclosure. According to an embodiment, the V2X system of FIG. 3 may correspond to an ITS station reference architecture defined in ISO 21217/EN302 665. FIG. 3 illustrates an example ITS station based on the reference architecture. FIG. 3 illustrates a hierarchical architecture for end-to-end communication. When messages are communicated between vehicles, the message is transferred down through each layer in the transmission vehicle/ITS system and is transferred up through each layer in the reception vehicle/ITS system. Each layer is described below.

Application layer: The application layer may implement and support various use cases. For example, the application may provide road safety, efficient traffic information, and other application information.

The application layer may classify and define ITS applications and provide services to the end vehicle/user/infrastructure through the lower layers. Applications may be defined/applied per use case or be defined/applied with their use cases grouped into, e.g., road-safety, traffic efficiency, local services, and infotainment. According to an embodiment, the application classification or use cases may be updated when a new application scenario occurs. The layer management may manage and service information related to the operation and security of the application layer. The information and service may be bi-laterally transferred and shared through the interface between management entity and application layer (MAMA) and the interface between security entity and ITS-S applications (SA) or the service access point (SAP) (e.g., MA-SAP or SA-SAP). The transfer of a request from the application layer to the facilities layer or information from the facilities layer to the application layer may be performed via the interface between facilities layer and ITS-S applications (FA) (or FA-SAP).

Facilities layer: The facilities layer may provide support for effectively implementing various use cases defined in the application layer. For example, the facilities layer may perform application support, information support, and session/communication support.

Basically, the facilities layer may support the functions of the top three layers of the OSI model, i.e., the session layer, presentation layer, and application layer. Additionally, the facilities layer may provide such evolved facilities as, e.g., application support, information support, and session/communication support for the ITS system. Facility means a component that provides functionality, information, or data.

Facilities may be classified into common facilities and domain facilities. The common facilities may provide a basic ITS application set and core services or functions necessary for ITS station operations. For example, time management, position management, and service management may be provided. The domain facilities may provide a specific service or function to one or more basic ITS application sets. For example, the domain facilities may provide decentralized notification messages (DENM) for road hazard warning applications (RHW). The domain facilities may be optional and, unless supported by the ITS station, may be not used.

Network/transport layer: The network/transport layer may configure a network for vehicular communication between homogeneous/heterogeneous networks by using various transport protocols and network protocols. For example, the network/transport layer may provide routing with the internet access using the internet protocol, such as TCP/UDP+IPv6. Or, the network/transport layer may configure a vehicle network using a geographical position-based protocol, such as basic transport protocol (BTP)/geonetworking.

The transport layer corresponds to a layer for linking between the services provided by the higher layers (session layer, presentation layer, and application layer) and the lower layers (network layer, data link layer, and physical layer). The transport layer plays a role to provide management so that the data sent from the user arrives precisely at the destination. At the transmission side, the transport layer may segment data into packets in a size suitable for efficient data transmission. At the reception side, the transport layer may merge the received packets back into the original file. According to an embodiment, as the transport protocol, the TCP/UDP may be used, or a transport protocol for the ITS, such as the VTS, may be used.

The network layer may assign a logical address and determine a packet transfer path. The network layer may receive the packets generated from the transport layer and add a network header including the logical address of the destination. As an example packet path design, vehicle-to-vehicle, vehicle-to-fixed station, or fixed station-to-fixed station unicast/broadcast may be taken into consideration. According to an embodiment, as the network protocol for the ITS, the geo-networking, IPv6 networking with mobility support, or IPv6 over geo-networking may be considered.

Access layer: The access layer may transmit messages/data received from the higher layer via a physical channel. For example, the access layer may perform/support data communication based on, e.g., IEEE 802.11 and/or 802.11p standard-based communication technology, IEEE 802.11 and/or 802.11p standard physical transmission technology-based ITS-G5 wireless communication technology, 2G/3G/4G (LTE)/5G wireless cellular communication technology including satellite/wideband wireless mobile communication, DVB-T/T2/ATSC or other wideband terrestrial digital broadcast technology, GPS technology, or IEEE 1609 WAVE technology.

The ITS system for vehicular communication and networking may be organically designed considering various access techniques, network protocols, and communication interfaces to provide various use cases. The role and functions of each layer may be supplemented.

Figure 4:
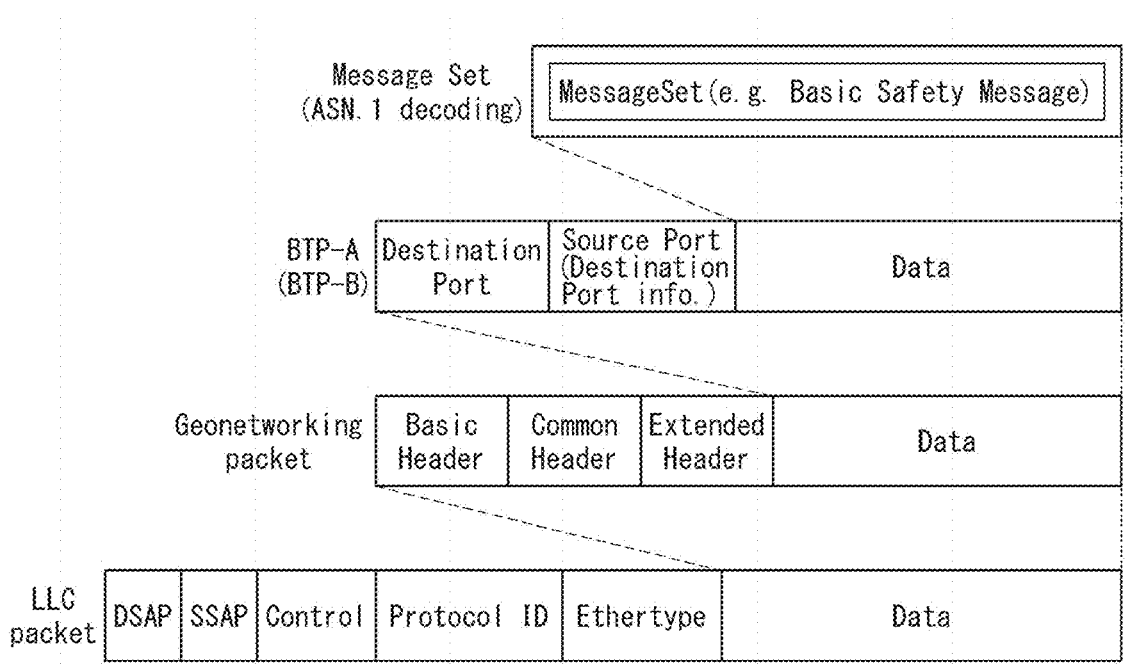
FIG. 4 illustrates a packet structure of a network/transport layer according to an embodiment of the disclosure.

FIG. 4 illustrates a packet structure of a network/transport layer according to an embodiment of the disclosure.

FIG. 4 illustrates a packet structure of a network/transport layer. The transport layer may generate BTP packets, and the network layer may generate geo-networking packets. The geo-networking packet may correspond to the data of the logical link control (LLC) packet and be included in the LLC packet. The geo-networking packet may be encapsulated into an LLC packet. In the embodiment of FIG. 4, the data may include a message set, and the message set may be a basic safety message.

The BTP is a protocol for transmitting messages, e.g., CAM or DENM, generated by the facilities layer, to the lower layer. The BTP header is configured in type A or type B. The type-A BTP header may include the destination port and source port which are necessary for interactive packet transmission. The type-B BTP header may include destination port and destination port information necessary for non-interactive packet transmission. The fields/information included in the header is described below.

Destination port: The destination port identifies the facility entity corresponding to the destination of the data (BTP-PDU) included in the BTP packet.

Source port: The source port is a field generated in the case of BTP-A type, and this indicates the port of the protocol entity of the facilities layer in the source where the packet is transmitted. This field may have a size of 16 bits.

Destination port information: This is a field generated in the case of BTP-B type and may provide additional information when the destination port is the most well-known port. This field may have a size of 16 bits.

The geo-networking packet includes a basic header and a common header depending on the protocol of the network layer and, depending on the geo-networking mode, optionally includes an extension header. The basic header may be 32-bit (4-byte) long. The basic header may include at least one of a version field, next header (NH) field, life time (LT) field, or remaining hop limit (RHL) field. The fields included in the basic header are described below. The size of the bits constituting each field is merely an example and may be varied.

Version (four bits): The version field indicates the version of the geo-networking protocol.

NH (four bits): The next header (NH) field indicates the type of the subsequent header/field. If the field value is 1, the common header follows and, if the field value is 2, a secured packet may follow.

LT (eight bits): The life time (LT) field indicates the maximum life time of the packet.

RHL (eight bits): The remaining hop limit (RHL) field indicates the remaining hop limit. The RHL field value may be decremented by one whenever forwarded from the geoadhoc router. If the RHL field value becomes 0, the packet is no longer forwarded.

The common header may be 64-bit (8-byte) long. The common header may include at least one of a next header (NH) field, header type (HT) field, header sub-type (HST) field, traffic class (TC) field, flags field, payload length (PL) field, and maximum hop limit (MHL) field. Each field is described below.

NH (four bits): The next header (NH) field indicates the type of the subsequent header/field. The field value being 0 indicates the packet of "ANY" type which is not defined, the field value being 1 indicates the packet of BTP-A type, the field value being 2 indicates the packet of BTP-B type, and the field value being 3 indicates the IP diagram of IPv6.

HT (four bits): This field indicates the geo-networking type. The geo-networking type includes beacon, geounicast, geoanycast, geobroadcast, topologically-scoped broadcast (TSB), or location service (LS).

HST (four bits): The header sub type field indicates the detailed type along with the header type. According to an embodiment, if the HT type is set to TSB, this may indicate single hop if the HST value is '0' and multi-hop if the HST value is '1.'

TC (eight bits): The traffic class field may include store-carry-forward (SCF), channel offload, and TC ID. The SCF field indicates whether the packet is stored unless there is a neighbor to which the packet is to be transferred. The channel offload field indicates that the packet may be transferred through other channel in the case of multi-channel operation. The TC ID field is a value assigned when the packet is transferred from the facilities layer and be used to set a contention window value in the physical layer.

Flags (eight bits): The flags field indicates whether the ITS device is mobile or stationary and, in an embodiment, this may be the last one bit.

PL (eight bits): The payload length field indicates, in bytes, the length of the data subsequent to the geo-networking header. For example, for CAM-carrying geo-networking packets, the PL field may indicate the length of the CAM and the BTP header.

MHL (eight bits): The maximum hop limit (MHL) field may indicate the maximum hop count.

An LLC header may be added to the geo-networking packet, generating an LLC packet. The LLC header provides the function of transmitting IP data and geo-networking data, with the IP data and the geo-networking data differentiated from each other. The IP data and the geo-networking data may be differentiated from each other by the ethertype of the SNAP. According to an embodiment, when the IP data is transmitted, the ethertype may be set to 0x86DD and be included in the LLC header. According to an embodiment, when the geo-networking data is transmitted, the ethertype may be set to 0x86DC and be included in the LLC header. The receiver may identify the ethertype field of the LLC packet header and, depending on the value, forward the packet to the IP data path or geo-networking path and process it.

Figure 5:
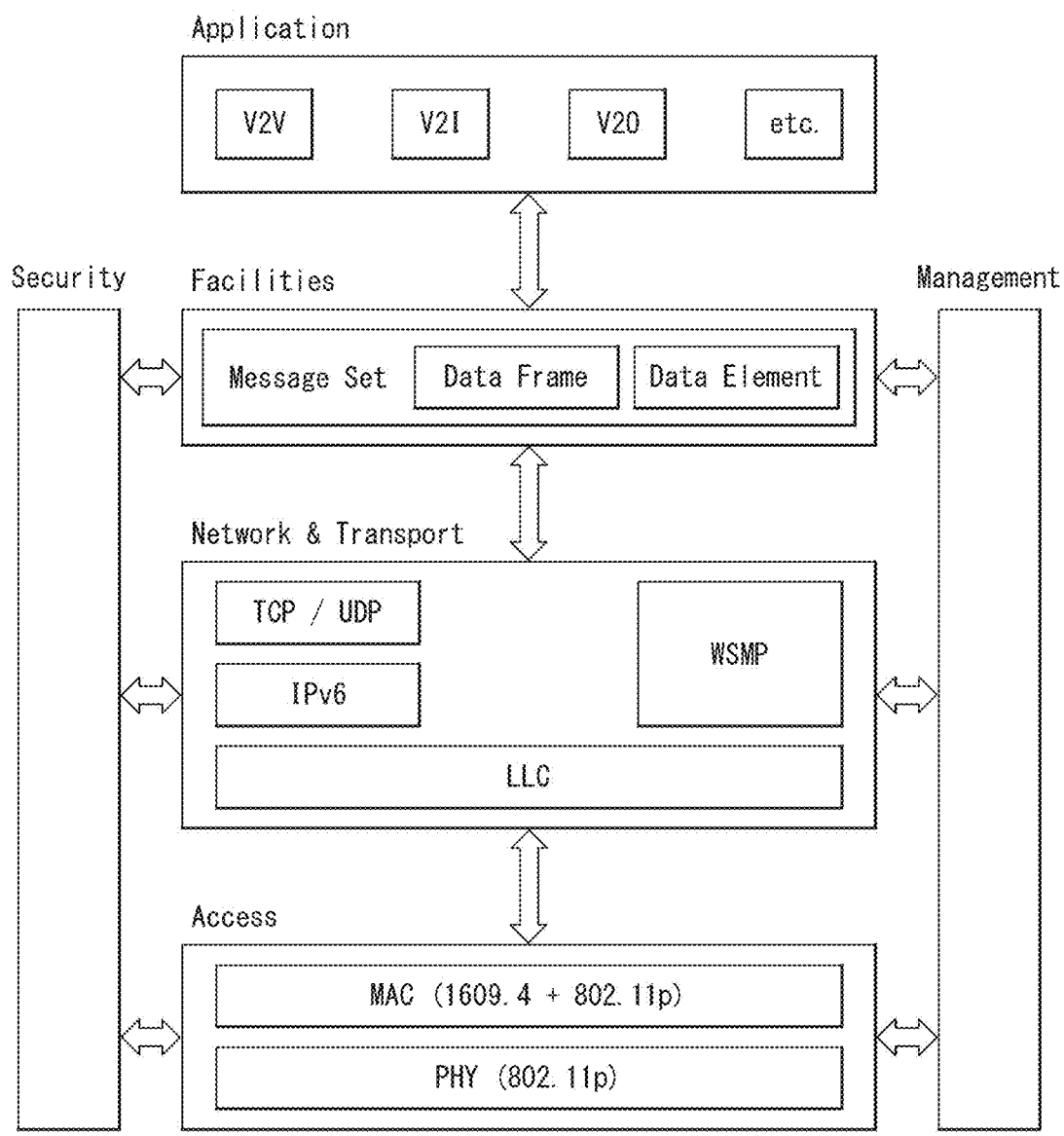
FIG. 5 illustrates a configuration of a V2X system according to another embodiment of the disclosure.

FIG. 5 illustrates a configuration of a V2X system according to another embodiment of the disclosure.

FIG. 5 illustrates a hierarchical architecture corresponding to another embodiment of the V2X system of FIG. 3. According to an embodiment, the north American V2X system uses IEEE 802.11 PHY and MAC technology and may additionally use IEEE 1609.4 MAC technology. In the network/transport layer technology, IEEE 802.2 standard technology may be applied to the LLC block, and IEEE 1609.3 technology may be applied to the WAVE short message protocol (WSMP). The facilities layer may use the message set of SAE J2735 standard, and the application layer may use the application defined for V2V, V2I, or V2O in the J2945 standard.

The application layer may perform the function of implementing and supporting use cases. The application may be optionally used depending on the use case. The system requirements for each use case may be defined in the J2945 standard. J2945/1 defines the application of V2V technology such as V2V safe communication.

The J2945/1 documentation defines applications such as emergency electronic brake lights (EEBL), forward crash warning (FCW), blind spot warning (BSW), lane change warning (LCW), intersection movement assist (IMA), and control loss warning (CLW). According to an embodiment, FCW technology is V2V safe communication technology that warns of colliding with a vehicle in front. When a V2X communication device-equipped vehicle comes to a sudden stop or stops due to an accident, the vehicle may transmit an FCW safety message to avoid collision with a following vehicle. The following vehicle may receive the FCW message, warn the driver, or control to decelerate or change lanes. In particular, even when another vehicle is between a parked vehicle and a driving vehicle, the state of the parked vehicle may advantageously be grasped via the FCW. The FCW safety message may include the vehicle's location information (latitude, longitude, and lane), vehicle information (kind, length, direction, and speed), event information (stop, sudden stop, and slow-down), and such information may be generated at the request of the facilities layer.

The facilities layer may correspond to OSI layer 5 (session layer), layer 6 (presentation layer), or layer 7 (application layer). The facilities layer may generate a message set depending on the context to support the application. The message set may be defined in the J2735 standard and be specified/decoded via ASN.1. The message set may include a BasicSafetyMessage message, a MapData message, a SPAT message, a CommonSafetyRequest message, an EmergencyVehicleAlert message, an IntersectionCollision message, a ProbeVehicleData message, a RoadSideAlert message, and a PersonalSafetyMessag message.

The facilities layer may compile information to be transmitted from the higher layer, generating a message set. The message set may be displayed in an abstract syntax notation 1 (ASN.1) scheme. ASN.1 is a notation used to specify data architectures and may also define encoding/decoding rules. ASN.1 does not depend upon a specific device, data representation scheme, programming language, or hardware platform. ASN.1 is a language for specifying data regardless of platforms and is the joint standard of CCITT (Consultative Committee on International Telegraphy and Telephony, X.208) and ISO (international Organization for Standardization, ISO 8824).

The message set is a collection of messages related to V2X operation. There is a message set that fits the context of the higher application. The message set may be represented in the format of a data frame and may include at least one element. Each element may include a data frame or data element.

The data frame expresses two or more data listings. The data frame may be a data element listing structure or a data frame listing structure. According to an embodiment, DV_vehicleData is a data frame structure indicating information for the vehicle and may include a plurality of data elements (e.g., Height, Bumbers, mass, or trailerweight). The data element defines a description for the data element. According to an embodiment, the element, Height, as used in the data frame is defined in DE_VehicleHeight and may represent the height of the vehicle. According to an embodiment, the height of the vehicle may be represented from 0 to 127, and the LBS unit is increased on a per-5 cm basis up to 6.35 meters.

According to an embodiment, a BasicSafetyMessage may be transmitted. The BasicSafetyMessage is the most basic, critical message in the message set and is used to periodically transmit the basic information for the vehicle. This message may include coreData defined as BSMcoreData and PartII and regional data which are optional. The coreData may include data elements such as msgCnt, id, lat, long, elev, speed, deading, break, or size. The coreData indicates the message count, ID, latitude, longitude, altitude, speed, direction, brake, and vehicle size by using the data elements. The BSM may transmit the information corresponding to the coreData typically in a period of 100 msec (ten times per second).

The network/transport layer may correspond to OSI layer 3 (network layer) and layer 4 (transport layer). To transmit the WAVE short message (WSM) transferred from the higher layer, the WAVE short message protocol (WSMP) may be used. Additionally, the IPv6/TCP protocol may be used to process conventional IP signals. The LLC block may use the IEEE802.2 standard and distinguish the IP diagram and WSM packet.

The access layer may correspond to OSI layer 1 (physical layer) and layer 2 (data link layer). The access layer may use the PHY and MAC technology of IEEE 802.11 and may additionally use the MAC technology of IEEE 1609.4 to support vehicle communication.

The security entity and management entity may be operated, connected over the entire period.

Figure 6:
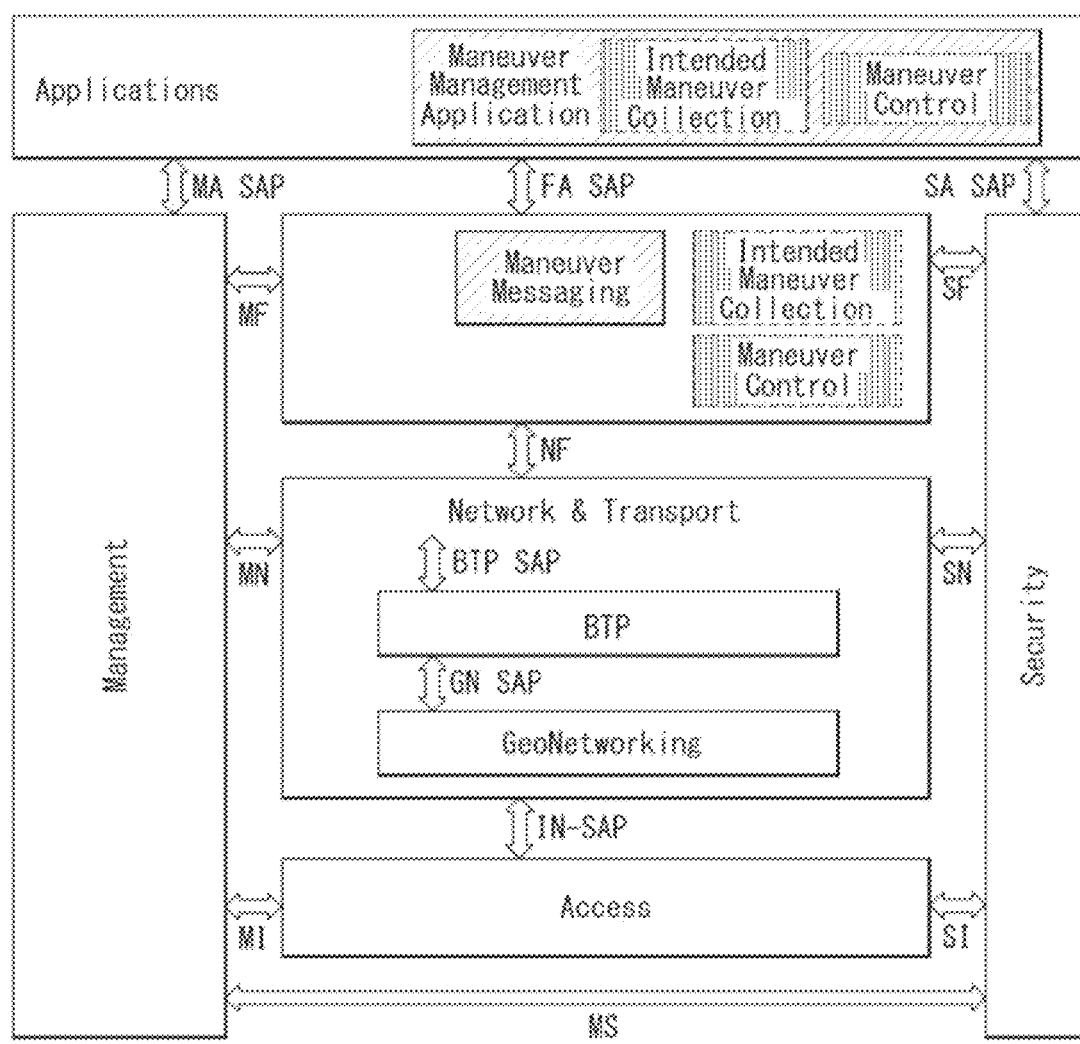
FIG. 6 illustrates a configuration of a V2X system of a vehicle transmitting driving information according to an embodiment of the present disclosure.

FIG. 6 illustrates a configuration of a V2X system of a vehicle transmitting driving information according to an embodiment of the present disclosure.

Referring to FIG. 6, a reporter may collect expected driving information for a vehicle after a current time through a maneuver collection function and transmit the driving information to the coordinator. Hereinafter, the description of the entities described above will be omitted.

The Maneuver management application entity initially generates data to be transmitted to another ITS-S and transmits the data to the facility layer. When the Maneuver Management Application Entity has an intended maneuver collection function of a vehicle, the Maneuver Management Application Entity transmits an intended maneuver to the facility layer. Otherwise, the Maneuver Management Application Entity transmits basic information with no intended maneuver to the facility layer.

When the Maneuver Management Application entity includes a start control function of a vehicle, a coordinated maneuver may be received from the facility layer to which the coordinator originally transmits the maneuver. Next, based the coordinated maneuver thus received, the actual driving (or maneuver) of the vehicle may be controlled.

The Maneuver Message Entity adds data to be transmitted to another ITS-S to the received data of the application layer, configures data (e.g., driving message) and transmits the configured message to the network and transport layer. When the facility layer includes the intended maneuver collection of vehicle, the facility layer adds data concerning an intended maneuver to a message and transmits the message to the network and transport layer. Otherwise, basic information is added to the message, which is then delivered to the network and transport layer.

That is, the reporter may generate a message including driving information on expected driving after a current time of the reporter and deliver the message to the network and transport layer.

Figure 7:
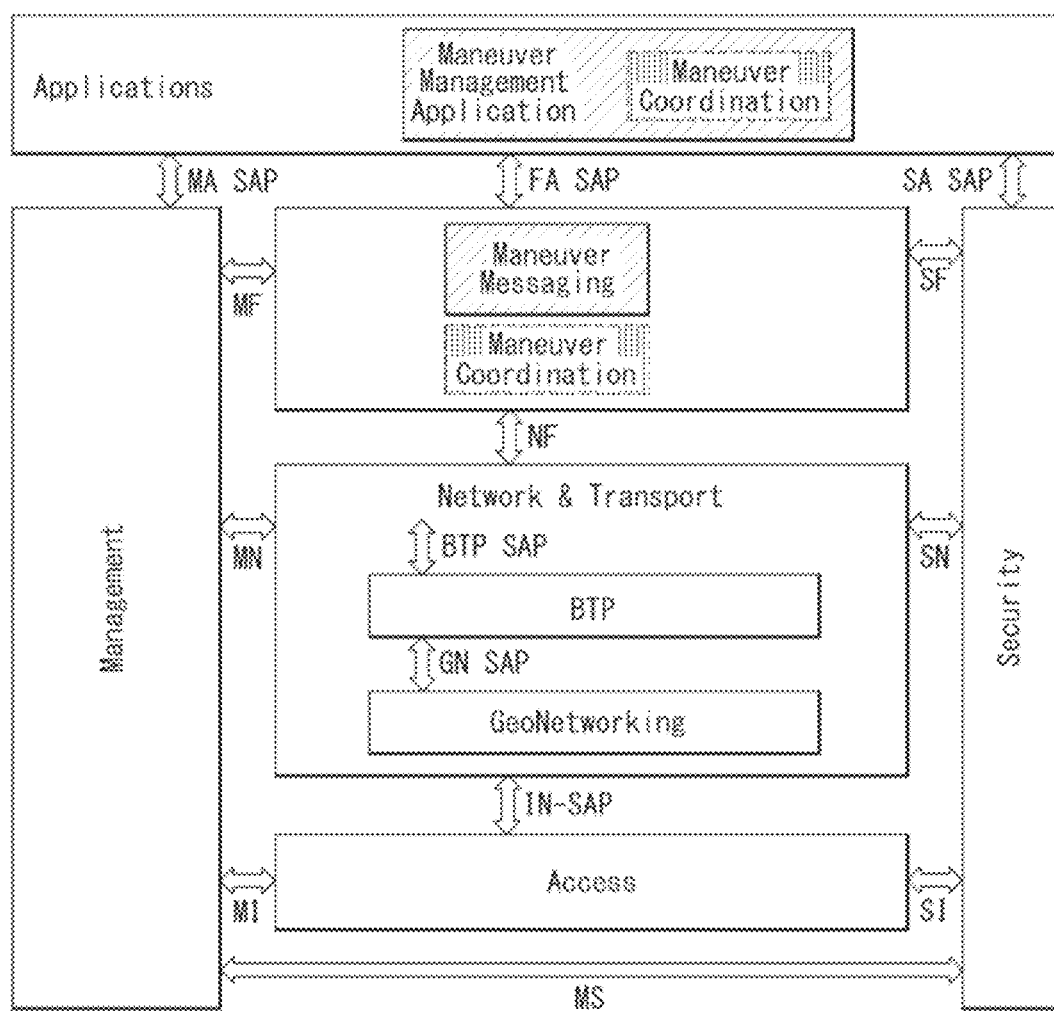
FIG. 7 illustrates a configuration of a V2X system of a coordinator according to an embodiment of the present disclosure.

FIG. 7 illustrates a configuration of a V2X system of a coordinator according to an embodiment of the present disclosure.

Referring to FIG. 7, a coordinator may generate driving information (or a coordinated maneuver) for optimized driving of each vehicle through an intended maneuver received from reporters and transmit the driving information to each reporter. Hereinafter, the description of the entities described above will be omitted.

When the maneuver management application entity includes a maneuver coordinator function, an intended maneuver may be received from the facility layer in which a reporter basically transmits the maneuver. Next, the maneuver management application entity determines a coordinated maneuver of each reporter according to the received intended maneuver and transmits the coordinated maneuver to the facility in which the maneuver is to be transmitted to each reporter.

That is, based on maneuver information that is transmitted from each reporter and is related to an anticipated driving operation after a current time of each reporter, the maneuver management application entity determines a coordinated maneuver (or vehicle driving management information) for optimizing the driving of vehicles and transmits the maneuver to the facility layer.

When the facility layer includes a maneuver coordination function, the maneuver message entity may extract (or decode) an intended maneuver from a message that is received from the network and transport layer and is originally transmitted from a coordinator. Next, the intended maneuver may be given to the maneuver coordination entity, and a coordinated maneuver for each reporter may be received. The maneuver message entity may transmit the coordinated maneuver to the network and transport layer in which the coordinated maneuver may be transmitted to a reporter. Otherwise, the maneuver message entity may receive and transmit basic information of the network and transport layer without maneuver information.

Based on intended maneuvers that are received, the maneuver coordination entity may determine coordinated maneuvers for each reporter and be included in the application layer or the facility layer.

That is, based on driving information that is received from reporters, a coordinator may determine and generate vehicle driving information (coordinated maneuver) for managing a driving operation for each reporter and include the information in a management message, thereby transmitting the information to each reporter.

Figure 8:
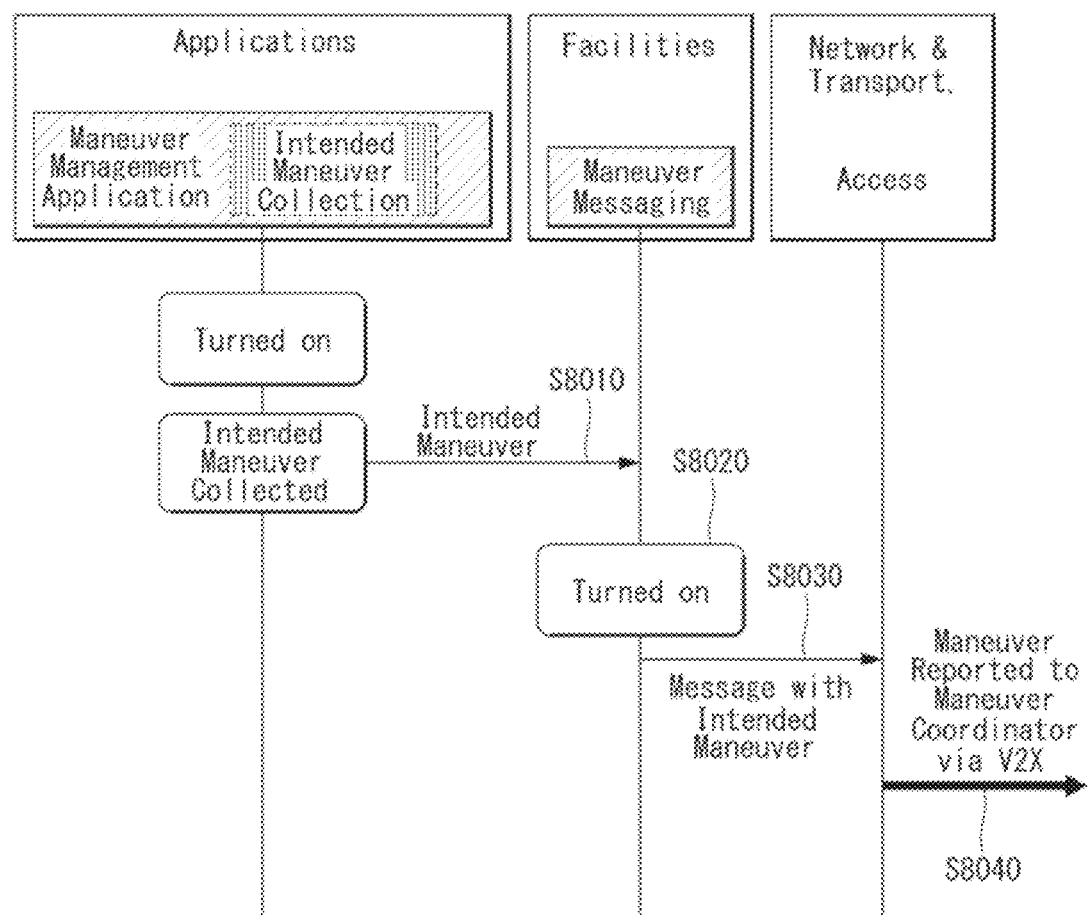
FIG. 8 is a flowchart illustrating an example of a method for transmitting driving information by a reporting vehicle according to an embodiment of the present disclosure.

FIG. 8 is a flowchart illustrating an example of a method for transmitting driving information by a reporting vehicle according to an embodiment of the present disclosure.

Referring to FIG. 8, when the maneuver management application entity has an intended maneuver collection function, the maneuver management application entity may collect maneuver information and transmit an intended maneuver to a coordinator through the network and transport entity.

Specifically, when a reporter is turned on and, as described in FIG. 6, the maneuver management application entity has an intended maneuver collection function, the maneuver management application entity collects an intended maneuver.

That is, the maneuver management application entity collects a maneuver (e.g., an anticipated driving operation or maneuver information), which is intended by a reporter after a current time, and transmits the intended maneuver thus collected to the maneuver message entity of the facility layer (S8010).

As described in FIG. 6, the maneuver message entity generates a driving message to be transmitted to a coordinator based on the intended maneuver (S8020) and transmits the generated driving message to the network and transport layer (S8030). Herein, the generated driving message may include an intended maneuver.

Next, the network and transport layer may transmit the driving message to a coordinator via V2X (S8040). Herein, the driving message may be transmitted via broadcast, multicast or unicast.

Through such a method, a reporter may report its anticipated driving operation to a coordinator.

Figure 9:
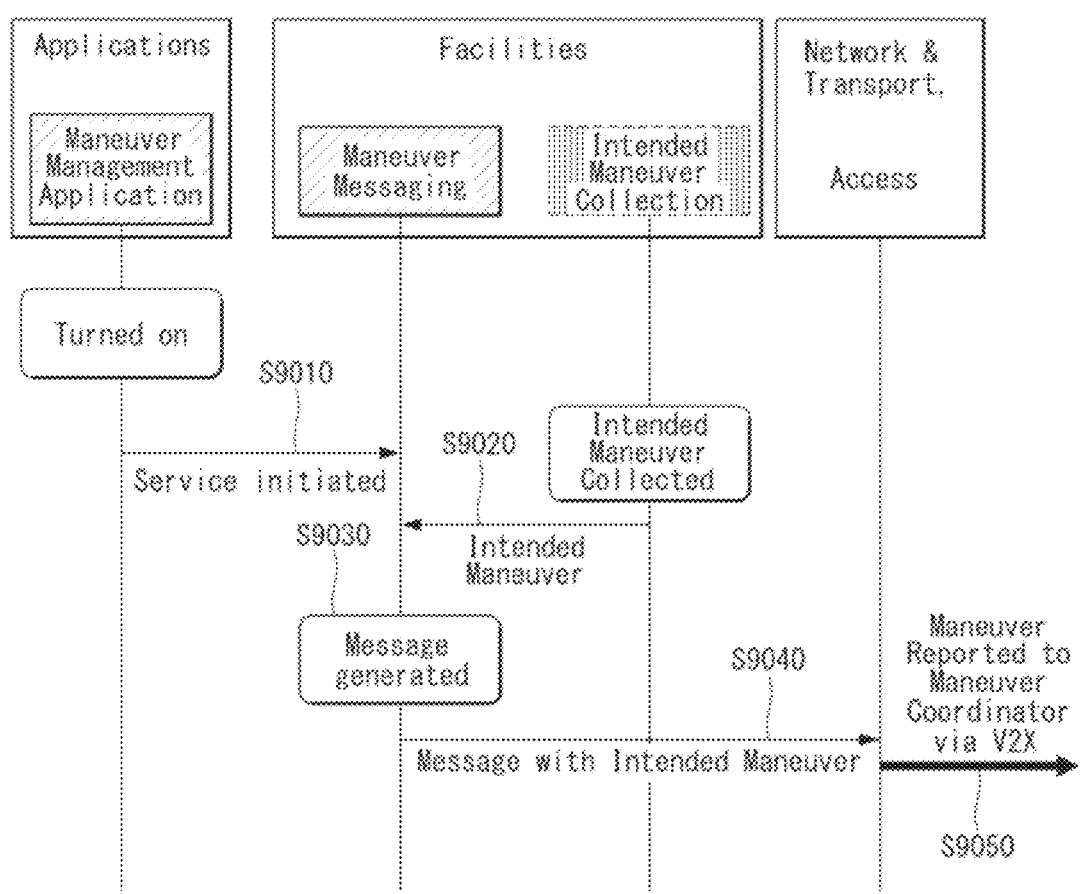
FIG. 9 is a flowchart illustrating another example of a method for transmitting driving information by a reporting vehicle according to an embodiment of the present disclosure.

FIG. 9 is a flowchart illustrating another example of a method for transmitting driving information by a reporting vehicle according to an embodiment of the present disclosure.

Referring to FIG. 9, when an intended maneuver collection function is included in the facility layer, the facility layer may collect maneuver information through the intended maneuver collection entity and transmit an intended maneuver to a coordinator through the network and transport entity.

Specifically, when a reporter is turned on and, as described in FIG. 6, the maneuver management application entity does not include the intended maneuver collection function, the maneuver management application entity transmits an initiation message to the maneuver message entity of the facility layer for notifying that a service is initiated (S9010).

When recognizing the initiation of service through the application layer, the facility layer collects an intended maneuver through the intended maneuver collection entity.

That is, the maneuver management application entity collects a maneuver (e.g., an anticipated driving operation or maneuver information), which is intended by a reporter after a current time, and transmits the intended maneuver thus collected to the maneuver message entity of the facility layer (S9020).

As described in FIG. 6, the maneuver message entity generates a driving message to be transmitted to a coordinator based on the intended maneuver (S9030) and transmits the generated driving message to the network and transport layer (S9040). Herein, the generated driving message may include an intended maneuver.

Next, the network and transport layer may transmit the driving message to a coordinator via V2X (S9050). Herein, the driving message may be transmitted via broadcast, multicast or unicast.

Through such a method, a reporter may report its anticipated driving operation to a coordinator.

Figure 10:
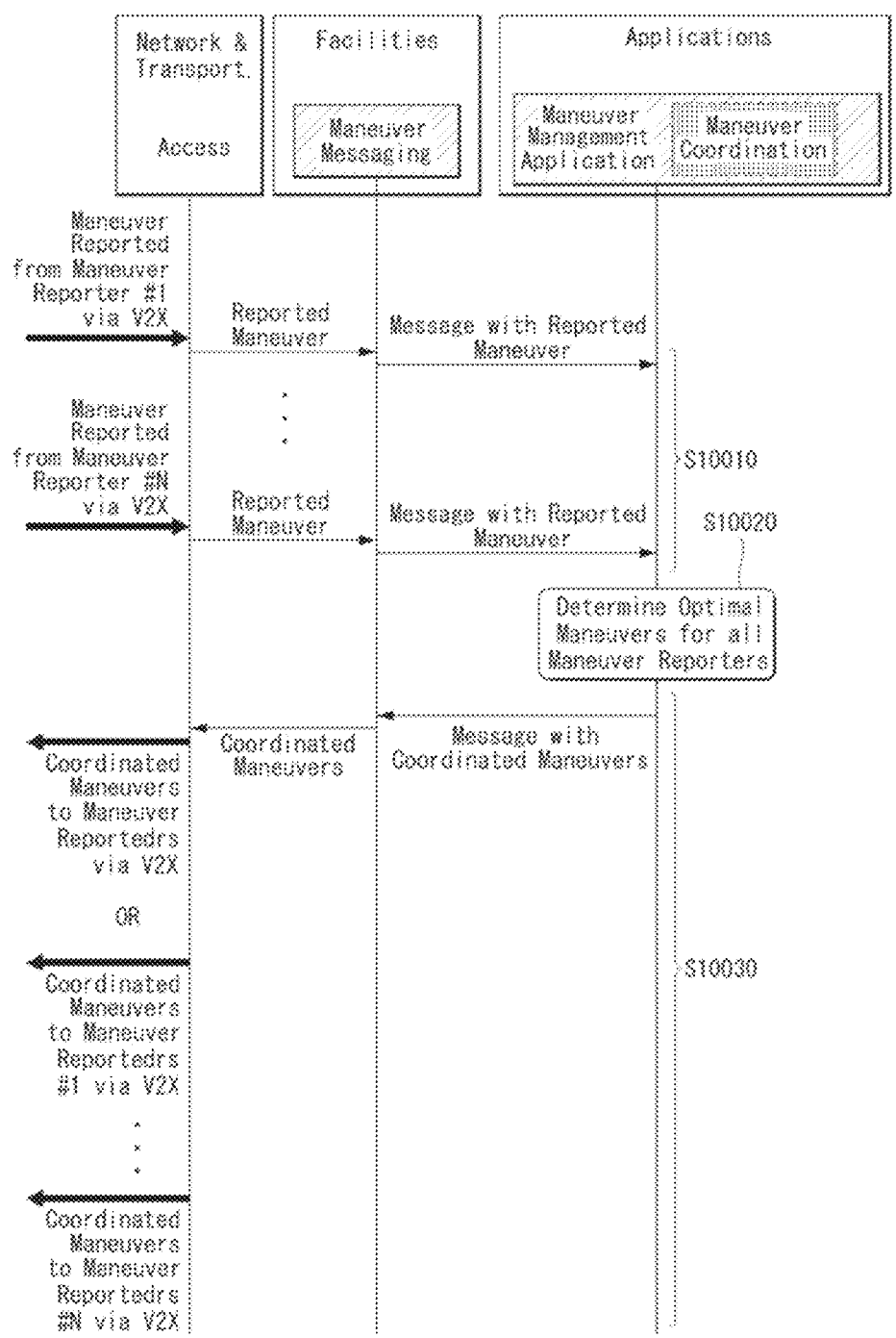
FIG. 10 is a flowchart illustrating an example of a method for transmitting optimal driving information by a coordinator for controlling the driving of vehicles according to an embodiment of the present disclosure.

FIG. 10 is a flowchart illustrating an example of a method for transmitting optimal driving information by a coordinator for controlling the driving of vehicles according to an embodiment of the present disclosure.

Referring to FIG. 10, a coordinator may recognize anticipated driving of neighboring reporters based on an intended maneuver that is driving information obtained from the reporters. Thus, the coordinator may coordinate an optimal driving operation and transmit the operation to each reporter, thereby controlling the operation of each reporter.

Specifically, after obtaining a driving message from each reporter via the network and transport layer, the coordinator transmits a reported maneuver, that is, an intended maneuver of each reporter included in the driving message to the maneuver message entity of the facility layer.

Next, the maneuver message entity of the facility layer transmits the driving message including the maneuver message to the maneuver management application entity of the application layer (S10010).

The maneuver management application entity may extract the reported maneuver from the driving message through a maneuver coordination function and determine an optimal maneuver for each maneuver based on the extracted reported maneuver of each reporter (S10020).

That is, based on anticipated driving information obtained from each reporter, an optimal driving operation of each reporter may be determined, and driving management information associated with the determined driving operation may be transmitted to the maneuver message entity of the facility layer.

In other words, the maneuver management application entity may determine vehicle driving management information for managing a driving operation of a reporter based on maneuver information via the maneuver coordination function and transmit the vehicle driving management information to the maneuver message entity.

The maneuver message entity may generate a message (management message) including a coordinated maneuver and transmit the generated management message to the network and transport layer.

Next, the network and transport layer may transmit the management message via V2X either to a plurality of reporters by using a broadcast method or to each of the plurality of reporters by using a multicast method or a unicast method (S10030).

Figure 11:
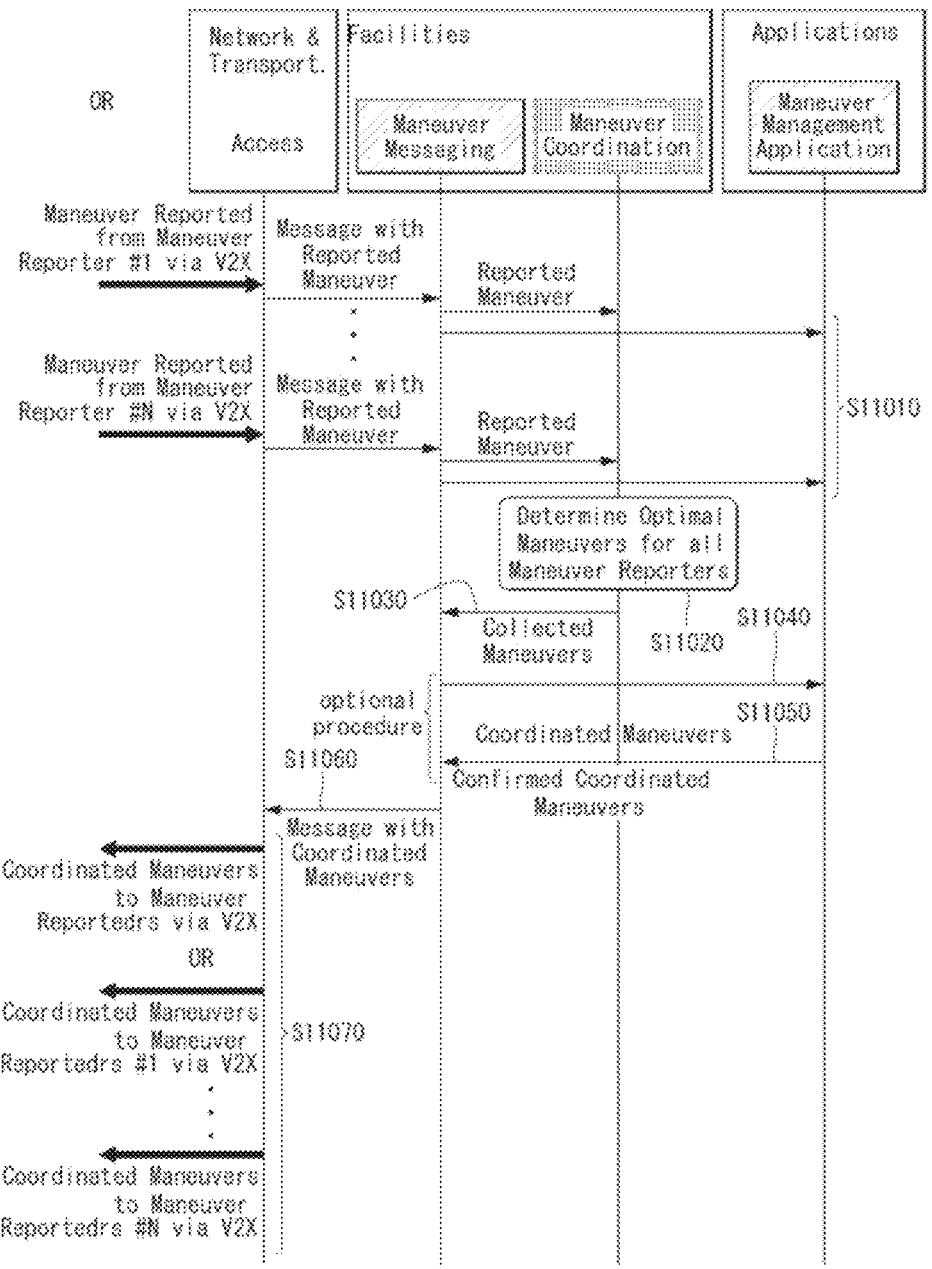
FIG. 11 is a flowchart illustrating another example of a method for transmitting optimal driving information by a coordinator for controlling the driving of vehicles according to an embodiment of the present disclosure.

FIG. 11 is a flowchart illustrating another example of a method for transmitting optimal driving information by a coordinator for controlling the driving of vehicles according to an embodiment of the present disclosure.

Referring to FIG. 11, when the facility layer of a coordinator includes a maneuver coordination function, an operation of each reporter may be controlled by coordinating an optimal driving operation in the facility layer and transmitting the operation to each reporter.

Specifically, after obtaining a driving message from each reporter via the network and transport layer, the coordinator transmits a reported maneuver, that is, an intended maneuver of each reporter included in the driving message to the maneuver message entity of the facility layer.

Next, the maneuver message entity of the facility layer transmits the driving message including the maneuver message to the maneuver coordination entity of the facility layer and the maneuver management application entity of the application layer (S11010).

The maneuver coordination entity performing the maneuver coordination function may extract the reported maneuver from the driving message and determine an optimal maneuver for each maneuver based on the extracted reported maneuver of each reporter (S11020).

That is, based on anticipated driving information obtained from each reporter, an optimal driving operation of each reporter may be determined, and driving management information associated with the determined driving operation may be transmitted to the maneuver message entity of the facility layer.

In other words, the maneuver coordination entity may determine vehicle driving management information for managing a driving operation of a reporter based on maneuver information via the maneuver coordination function and transmit the vehicle driving management information to the maneuver message entity (S11030).

Next, the maneuver message entity may transmit a coordinated maneuver to the maneuver management application entity of the application layer in order to confirm the coordinated maneuver (S11040). When the coordinated maneuver is confirmed by the maneuver management application entity, the maneuver message entity may receive the coordinated maneuver thus confirmed from the maneuver management application entity (S11050).

The step S11040 and the step S11050 are selective steps and may not be implemented.

The maneuver message entity may generate a message (management message) including the coordinated maneuver and transmit the generated management message to the network and transport layer (S11060).

Next, the network and transport layer may transmit the management message via V2X either to a plurality of reporters by using a broadcast method or to each of the plurality of reporters by using a multicast method or a unicast method (S11070).

Figure 12:
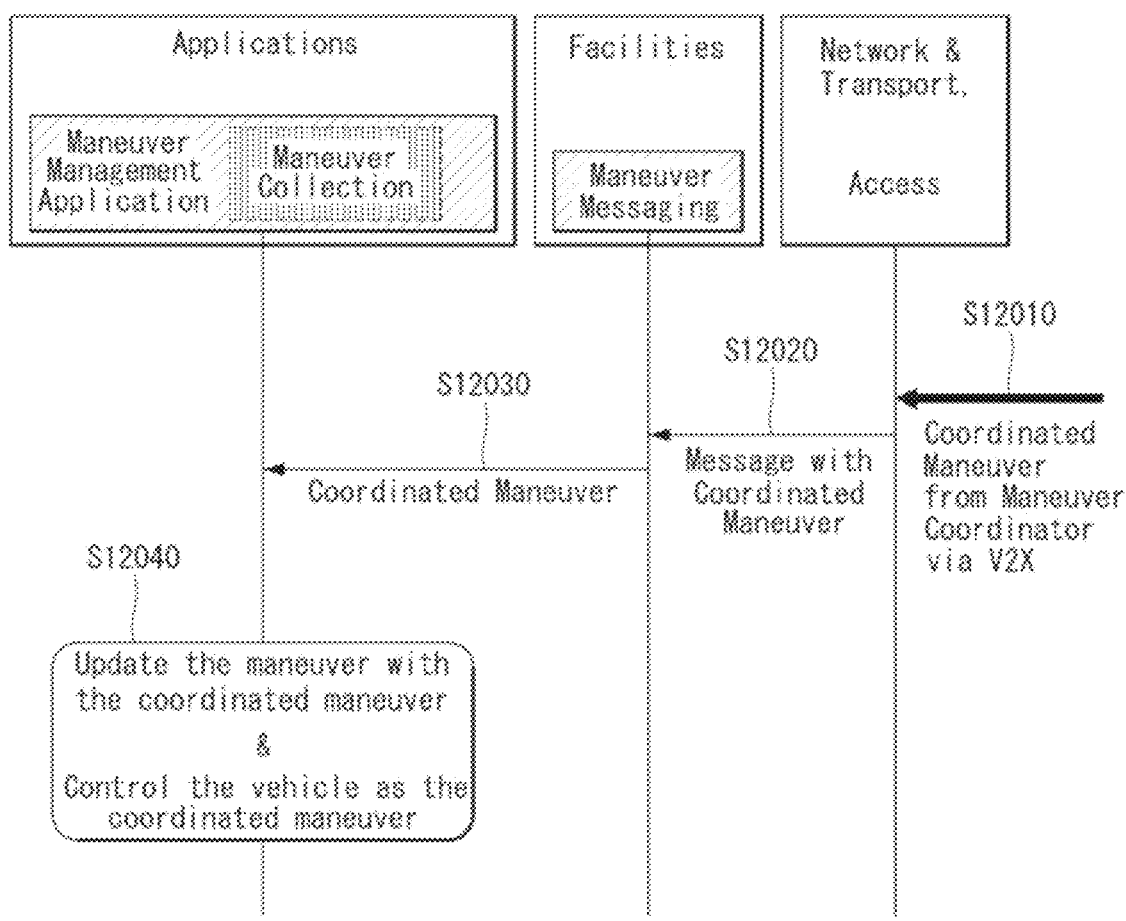
FIG. 12 is a flowchart illustrating an example of a method for driving in accordance with optimal driving information transmitted from a coordinator of a reporting vehicle according to an embodiment of the present disclosure.

FIG. 12 is a flowchart illustrating an example of a method for driving in accordance with optimal driving information transmitted from a coordinator of a reporting vehicle according to an embodiment of the present disclosure.

Referring to FIG. 12, when obtaining a coordinated maneuver for controlling a driving operation of a reporter from a coordinator via V2X, the reporter may update its maneuver and control the driving of a vehicle according to the coordinated maneuver.

Specifically, through the method described in FIG. 11 and FIG. 12, the reporter may obtain a coordinated maneuver from a coordinator via a management message (S12010).

As the coordinated maneuver (or vehicle driving management information) is generated based on intended maneuvers obtained from reporters, the coordinated maneuver may mean driving information that is coordinated for optimal driving of vehicles by the coordinator based on anticipated operations of vehicles after a current time.

The network and transport layer transmits an obtained management message to the maneuver message entity of the facility layer, and the maneuver message entity extracts the coordinated maneuver included in the management message and deliver the coordinated maneuver to the maneuver management application entity (512030).

The maneuver management application entity may update its intended maneuver based on the coordinated maneuver through a maneuver control function and may control a vehicle (S12040).

That is, the application layer may modify its intended driving operation after a current time based on the coordinated maneuver and control an operation of a vehicle based on the modified driving operation.

Through such a method, an operation of a vehicle may be controlled so that an optimal driving operation can be performed between vehicles.

Figure 13:
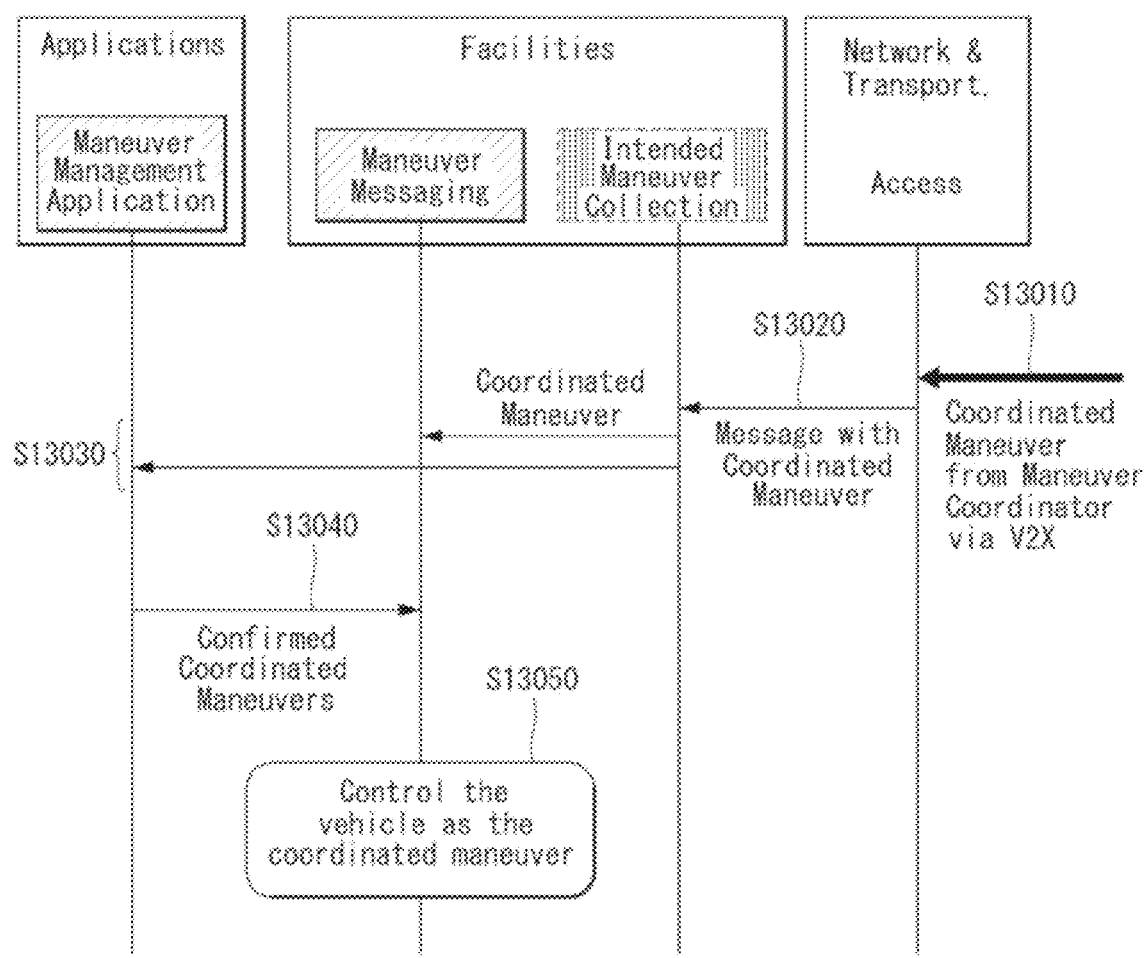
FIG. 13 is a flowchart illustrating another example of a method for driving in accordance with optimal driving information transmitted from a coordinator of a reporting vehicle according to an embodiment of the present disclosure.

FIG. 13 is a flowchart illustrating another example of a method for driving in accordance with optimal driving information transmitted from a coordinator of a reporting vehicle according to an embodiment of the present disclosure.

First, since the step S13010 and the step S13020 are the same as the step S12010 and the step 12020 of FIG. 12, their description will be skipped.

In the embodiment of FIG. 13, since the maneuver control entity with maneuver control function is included in the facility layer, the maneuver message entity may extract a coordinated maneuver and deliver the maneuver to the maneuver control entity and the maneuver management application entity of the application layer (S13030).

Next, the maneuver management application entity confirms whether or not the coordinated maneuver is valid and then transmits the coordinated maneuver thus confirmed to the maneuver control entity (S13040).

Through the maneuver control function, the maneuver control entity may control a vehicle based on the coordinated maneuver that is confirmed (S13050).

That is, the maneuver control entity may control an operation of vehicle based on a modified driving operation.

Hereinafter, a message format of each step described in FIGS. 8 to 13 will be examined.

The intended maneuver (or anticipated driving information, maneuver information etc.) and the coordinated maneuver (or vehicle driving management information), which are described in FIGS. 8 to 13, may comprise the following data elements and frames. Herein, the coordinated maneuver may indicate only "accept" or "reject" for the intended maneuver.

Table 1 below shows an example of category field of maneuver for distinguishing an intended maneuver and a coordinated maneuver.

TABLE 1

| Field | Description |
| --- | --- |
| Maneuver Category | 0: reported intended maneuver<br>1: coordinated maneuver<br>. . . |

Through the category field of Table 1, a reporter and a coordinator may determine whether a transmitted maneuver is an intended maneuver or a coordinated maneuver.

Table 2 below shows an example of type field indicating a type of maneuver.

TABLE 2

| Field | Description |
| --- | --- |
| Maneuver Type | 0: forward driving without lane change<br>1: backward driving without lane change<br>2: lane change to the left<br>3: lane change to the right<br>4: overtake<br>. . . |

A type field indicates one maneuver type among predefined maneuver types. That is, a type may indicate a type of operations that are intended after the current time.

Table 3 below shows an example of classification of necessary maneuvers for single lane and lane change operations according to maneuver types.

TABLE 3

| Field | | | Description |
| --- | --- | --- | --- |
| Maneuver List | | | Can include one or more Single Lane Maneuver Segments and Lane Change Maneuver Segments. |
| Single Lane Maneuver Segment | | | |
| | Lane ID | | Identification of a lane |
| | Position | Start | Starting position on the lane |
| | | End | Ending position on the lane |
| | Time | Earliest | Earliest time in the geographical interval described by Position |
| | | Latest | Latest time in the geographical interval described by Position |
| | Heading | | Heading for the geographical interval described by Position |
| | Speed | Lowest | Lowest speed for the geographical interval described by Position |
| | | Highest | Highest speed for the geographical interval described by Position |
| | Acceleration | Lowest | Lowest acceleration for the geographical interval described by Position |
| | | Highest | Highest acceleration for the geographical interval described by Position |
| Lane Change Maneuver Segment | | | |
| | Lane ID | Start | Identification of the lane before changing lanes |
| | | End | Identification of the lane after changing lanes |

TABLE 3-continued

| Field | | Description |
|---|---|---|
| Position | Start | Starting position on the lane specified by Lane ID::Start |
| | End | Ending position on the lane specified by Lane ID::End |
| Time | Earliest | Earliest time in the geographical area described by Position |
| | Latest | Latest time in the geographical area described by Position |
| Heading | | Heading for the geographical area described by Position |
| Speed | Lowest | Lowest speed for the geographical area described by Position |
| | Highest | Highest speed for the geographical area described by Position |
| Acceleration | Lowest | Lowest acceleration for the geographical area described by Position |
| | Highest | Highest acceleration for the geographical area described by Position |

In Table 3, the maneuver list field indicates one or more operations of vehicle and information for the operations according to whether an operation of a vehicle is driving on a single lane or an operation of lane change.

In Table 3, Lane ID may uniquely identify a specific lane of a specific road. That is, a road, on which a current vehicle is running, will run or will change lanes, may be identified through Lane ID. Lane ID may be a single element or an element combined with road ID and lane ID associated with the road ID.

Figure 14:
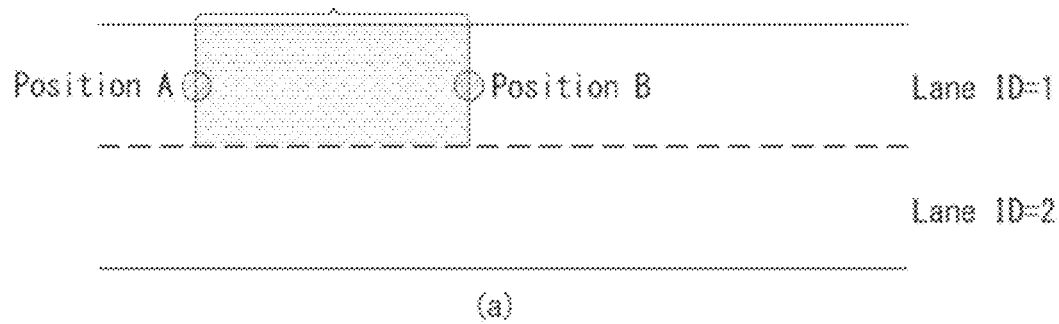
FIG. 14 is a diagram illustrating an example of a road driving method for a vehicle through maneuver information according to an embodiment of the present disclosure.
Figure 14:
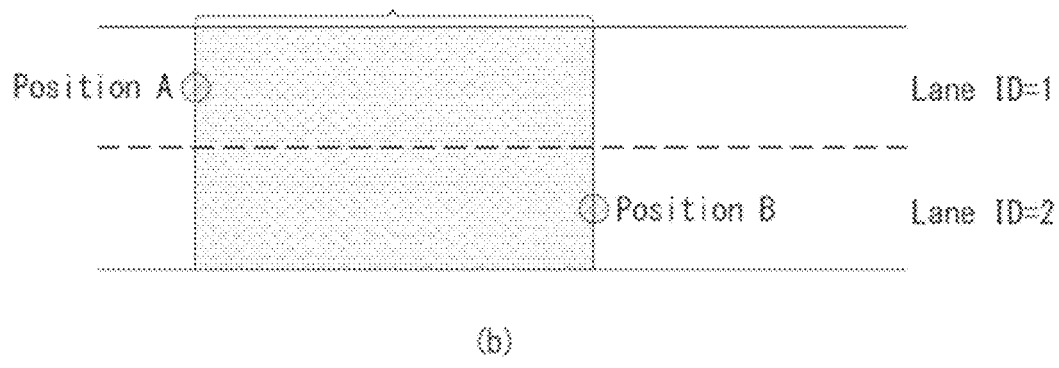

FIG. 14 is a diagram illustrating an example of a road driving method for a vehicle through maneuver information according to an embodiment of the present disclosure.

(a) in FIG. 14 exemplifies parameters included in a maneuver list of maneuver information when a reporter vehicle runs on a single lane. (b) in FIG. 14 exemplifies parameters included in a maneuver list of maneuver information when the vehicle makes a lane change.

Specifically, a geographical interval of a single lane maneuver segment may be identified by means of a lane ID and a position. A vehicle may be located on an identified lane within a geographical interval described in a single lane maneuver segment.

A single lane maneuver segment may include limits on time, heading, speed and acceleration that a vehicle is supposed to satisfy within a geographical interval. That is, as illustrated in Table 3, when a vehicle intends to keep running on a single lane after a current time, a single lane maneuver segment of a maneuver list may include time for the vehicle to travel (from the earliest time to the latest time), position (start position and end position of travel), speed (lowest speed and highest speed) and acceleration (lowest acceleration and highest acceleration).

The sub-elements of a single lane maneuver segment except a lane ID may have "UNBOUNDED" values. "UNBOUNDED" of Position:: Start may mean a current position of a vehicle. "UNBOUNDED" for Position:: End may mean that a geographical interval is boundlessly long together with a lane as long as a maneuver is not updated. When there is an "UNBOUNDED" value in either Position:: Start or Position:: End, "Heading" should exist. Otherwise, "Heading" may not exist.

For a sub-element of time, speed or acceleration, "UNBOUNDED" means that there is no limitation associated with the sub-element. The absence of an element may define another syntax that operates like the above-described "UNBOUNDED" value.

For example, as illustrated in (a) of FIG. 14, when a vehicle intends to travel from the position A to the position B on a lane of which the ID is 1, the vehicle may include Lane ID=1, Position:: Start=Position A and Position::End=B in maneuver information and transmit the information to a coordinator.

When a lane change is intended, a geographical area of a lane change maneuver segment is identified by means of a lane ID and a position. A vehicle is permitted to be located on any one of identified lanes within a geographical area that is described by a lane change maneuver segment. That is, a lane change should be made in a geographical area. Limits on time, heading, speed and acceleration, which a vehicle is supposed to satisfy within a geographical area, may be included in a lane change maneuver segment.

The sub-elements of a single lane maneuver segment except a lane ID may have "UNBOUNDED" values. "UNBOUNDED" of Position:: Start may mean a current position of a vehicle. "UNBOUNDED" for Position:: End may mean that a geographical area is boundlessly long together with a lane as long as a maneuver is not updated. When there is an "UNBOUNDED" value in either Position:: Start or Position:: End, a heading should exist.

Otherwise, the heading may not exist. For a sub-element of time, speed or acceleration, "UNBOUNDED" means that there is no limitation associated with the sub-element. The absence of an element may define another syntax that operates like the above-described "UNBOUNDED" value.

For example, as illustrated in (b) of FIG. 14, when a vehicle intends to make a lane change between the position A of a lane, of which the ID is 1, and the position B of another lane, of which the ID is 2, after a current time, the vehicle may include Lane ID=1, Lane ID=2, Position:: Start=Position A, and Position::End=B in maneuver information and transmit the information to a coordinator.

That is, the parameters shown in Table 4 below may be included in the maneuver information.

TABLE 4

| Field | | Value |
|---|---|---|
| Maneuver List | | |
| Single Lane Maneuver Segment | | |
| Lane ID | | 1 |
| Position | Start | A |
| | End | B |
| Lane Change Maneuver Segment | | |
| Lane ID | Start | 1 |
| | End | 2 |
| Position | Start | B |
| | End | E |
| Single Lane Maneuver Segment | | |
| Lane ID | | 2 |
| Position | Start | E |
| | End | UNBOUNDED |

Table 5 below shows an example of classification of necessary maneuvers for single lane and lane change operations according to maneuver types.

TABLE 5

| Field | | Description |
|---|---|---|
| Maneuver List Maneuver Segment | | Can include one or more Maneuver Segments |
| Maneuver Segment Type (MST) | | 0: Single Lane Maneuver Segment<br>1: Lane Change Maneuver Segment<br>... |
| Lane ID | Start | If MST = 0, Identification of a lane.<br>If MST = 1, Identification of the lane before changing lanes |
| | End | If MST = 0, Not exist<br>If MST = 1, Identification of the lane after changing lanes |
| Position | Start | If MST = 0, Starting position on the lane<br>If MST = 1, Starting position on the lane specified by Lane ID::Start |
| | End | If MST = 0, Ending position on the lane<br>If MST = 1, Ending position on the lane specified by Lane ID::End |
| Time | Earliest | If MST = 0, Earliest time in the geographical interval described by Position<br>If MST = 1, Earliest time in the geographical area described by Position |
| | Latest | If MST = 0, Latest time in the geographical interval described by Position<br>If MST = 1, Latest time in the geographical area described by Position |
| Heading | | If MST = 0, Heading for the geographical interval described by Position<br>If MST = 1, Heading for the geographical area described by Position |
| Speed | Lowest | If MST = 0, Lowest speed for the geographical interval described by Position<br>If MST = 1, Lowest speed for the geographical area described by Position |
| | Highest | If MST = 0, Highest speed for the geographical interval described by Position<br>If MST = 1, Highest speed for the geographical area described by Position |
| Acceleration | Lowest | If MST = 0, Lowest acceleration for the geographical interval described by Position<br>If MST = 1, Lowest acceleration for the geographical area described by Position |
| | Highest | If MST = 0, Highest acceleration for the geographical interval described by Position<br>If MST = 1, Highest acceleration for the geographical area described by Position |

In Table 5, a form of maneuver segment may include both a single lane maneuver segment and a lane change maneuver segment that have an indicator of maneuver segment type.

Parameters for a single lane maneuver segment and a lane change maneuver segment may be applied according to a value of maneuver segment type.

Table 6 below exemplifies parameters included in maneuver information according to Table

TABLE 6

| Field | | Value |
|---|---|---|
| Maneuver List Maneuver Segment | | |
| Maneuver Segment Type | | 0 |
| Lane ID | Start | 1 |
| Position | Start | A |
| | End | B |
| ~~~ | | |

TABLE 6-continued

| Field | | Value |
|---|---|---|
| Maneuver Segment | | |
| Maneuver Segment Type | | 1 |
| Lane ID | Start | 1 |
| | End | 2 |
| Position | Start | B |
| | End | E |
| ~~~ | | |
| Maneuver Segment | | |
| Maneuver Segment Type | | 0 |
| Lane ID | Start | 2 |
| Position | Start | E |
| | End | UNBOUNDED |
| ~~~ | | |

Figure 15:
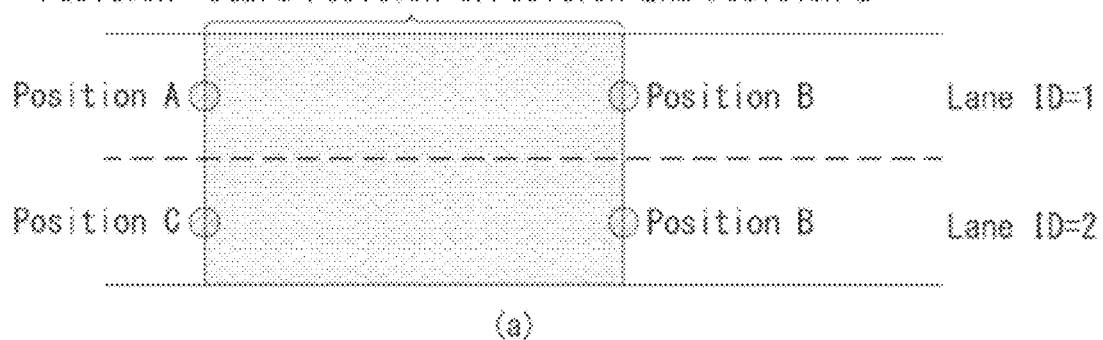
FIG. 15 is a diagram illustrating another example of a road driving method for a vehicle through maneuver information according to an embodiment of the present disclosure.
Figure 15:
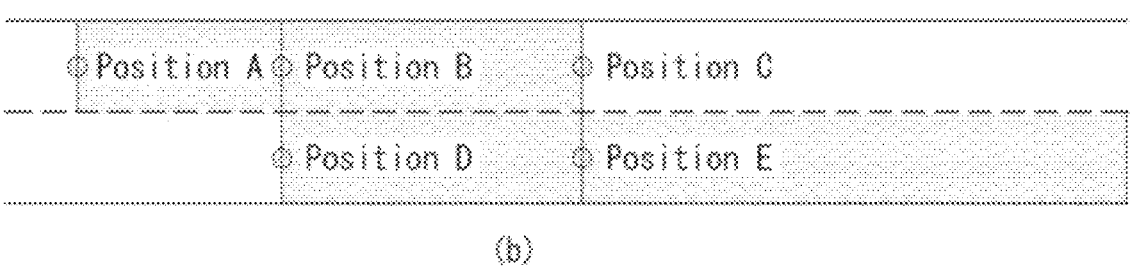

FIG. 15 is a diagram illustrating another example of a road driving method for a vehicle through maneuver information according to an embodiment of the present disclosure.

Referring to FIG. 15, when a vehicle runs only on a single lane after a current time or runs on another lane for at least a certain time after making a lane change, the vehicle may include associated information in maneuver information and transmit the maneuver information to a coordinator.

Table 7 below shows an example of classification of necessary maneuvers for a single lane operation according to maneuver types.

TABLE 7

| Field | | Description |
|---|---|---|
| Maneuver List | | Can include one or more Single Lane Maneuver Segments |
| Single Lane Maneuver Segment | | |
| Lane ID | | Identification of a lane |
| Position | Start | Starting position on the lane |
| | End | Ending position on the lane |
| Time | Earliest | Earliest time in the geographical interval described by Position |
| | Latest | Latest time in the geographical interval described by Position |
| Heading | | Heading for the geographical interval described by Position |
| Speed | Lowest | Lowest speed for the geographical interval described by Position |
| | Highest | Highest speed for the geographical interval described by Position |
| Acceleration | Lowest | Lowest acceleration for the geographical interval described by Position |
| | Highest | Highest acceleration for the geographical interval described by Position |

In the case of Table 7, a maneuver segment element may be applied in the same manner as a lane change maneuver segment in two or more single lanes.

For example, as illustrated in (a) of FIG. 15, maneuver segment elements for two lanes may be maneuver information, similarly as described in (b) of FIG. 14, including the following parameters: Lane ID=1, Position:: Start=Position A, Position::End=Position B, Lane ID=2, Position:: Start=Position C, and Position::End=Position D.

Table 8 below exemplifies parameters included in maneuver information according to Table 7.

TABLE 8

| Field | | Value |
|---|---|---|
| Maneuver List | | |
| Single Lane Maneuver Segment | | |
| Lane ID | | 1 |
| Position | Start | A |
| | End | C |
| ~~~ | | |
| Single Lane Maneuver Segment | | |
| Lane ID | | 2 |
| Position | Start | D |
| | End | UNBOUNDED |
| ~~~ | | |

Figure 16:
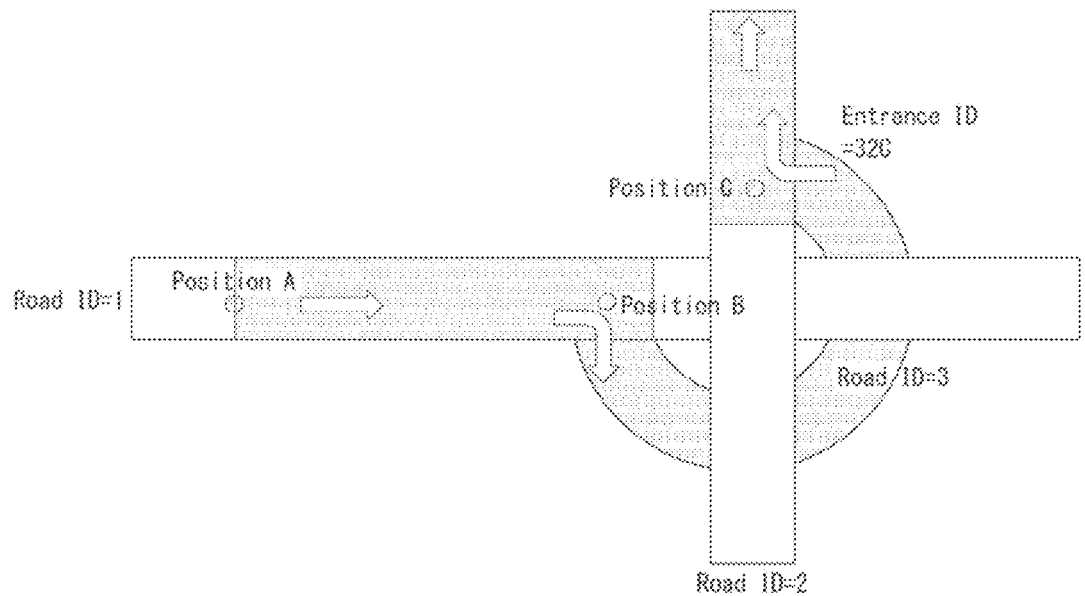
FIG. 16 is a diagram illustrating another example of maneuver information for the road driving of a vehicle according to an embodiment of the present disclosure.

FIG. 16 is a diagram illustrating another example of maneuver information for the road driving of a vehicle according to an embodiment of the present disclosure.

Referring to FIG. 16, a vehicle may include driving information, which is expected not for a short segment but for a long segment, in a driving message and transmit the driving message to a coordinator.

Table 9 and Table 10 below exemplify parameters of fields included in maneuver information associated with driving a long segment.

TABLE 9

| Field | | Description |
|---|---|---|
| Long Term Maneuver List | | Can include one or more Road Maneuver Segments |
| Road Maneuver Segment | | |
| Entrance ID | | Identification of an entrance to a road described by Road ID |
| Road ID | | Identification of a road |
| Position | Start | Starting position on the road |
| | End | Ending position on the road |
| Time | Earliest | Earliest time in the geographical interval described by Position |
| | Latest | Latest time in the geographical interval described by Position |
| Heading | | Heading for the geographical interval described by Position |
| Speed | Lowest | Lowest speed for the geographical interval described by Position |
| | Highest | Highest speed for the geographical interval described by Position |
| Acceleration | Lowest | Lowest acceleration for the geographical interval described by Position |
| | Highest | Highest acceleration for the geographical interval described by Position |
| Exit ID | | Identification of an exit from a road described by Road ID |

TABLE 10

| Field | | Description |
|---|---|---|
| Long Term Maneuver List | | Can include one or more Road Maneuver Segments |
| Road Maneuver Segment | | |
| Entrance ID | | Identification of an entrance to a road described by Road ID |
| Road ID | | Identification of a road |

TABLE 10-continued

| Field | | Description |
|---|---|---|
| Position | Start | Starting position on the road |
| | End | Ending position on the road |
| Time | Earliest | Earliest time in the geographical interval described by Position |
| | Latest | Latest time in the geographical interval described by Position |
| Heading | Minimum | Minimum heading value for the geographical interval described by Position |
| | Maximum | Maximum heading value for the geographical interval described by Position |
| Speed | Lowest | Lowest speed for the geographical interval described by Position |
| | Highest | Highest speed for the geographical interval described by Position |
| Acceleration | Lowest | Lowest acceleration for the geographical interval described by Position |
| | Highest | Highest acceleration for the geographical interval described by Position |
| Exit ID | | Identification of an exit from a road described by Road ID |

According to Table 9 and Table 10, expected driving information for a long segment may not include detailed parameters for a specific lane, and an element of "Heading" may deal with a range instead of a specific value.

For example, as illustrated in FIG. 16, when a vehicle moves from the position A to the position B, turns to the segment with Road ID=3 and then comes to the position C, the parameters included in maneuver information may be as shown in Table 11.

TABLE 11

| Long Term Maneuver List | | |
|---|---|---|
| Road Maneuver Segment | | |
| Road ID | | 1 |
| Position | Start | A |
| | End | B |
| ~~~ | | |
| Exit ID | | 31A |
| Road Maneuver Segment | | |
| Entrance ID | | 31A |
| Road ID | | 3 |
| Position | Start | B |
| | End | C |
| ~~~ | | |
| Exit ID | | 32C |
| Road Maneuver Segment | | |
| Entrance ID | | 32C |
| Road ID | | 2 |
| Position | Start | C |
| | End | UNBOUND |
| ~~~ | | |

Figure 17:
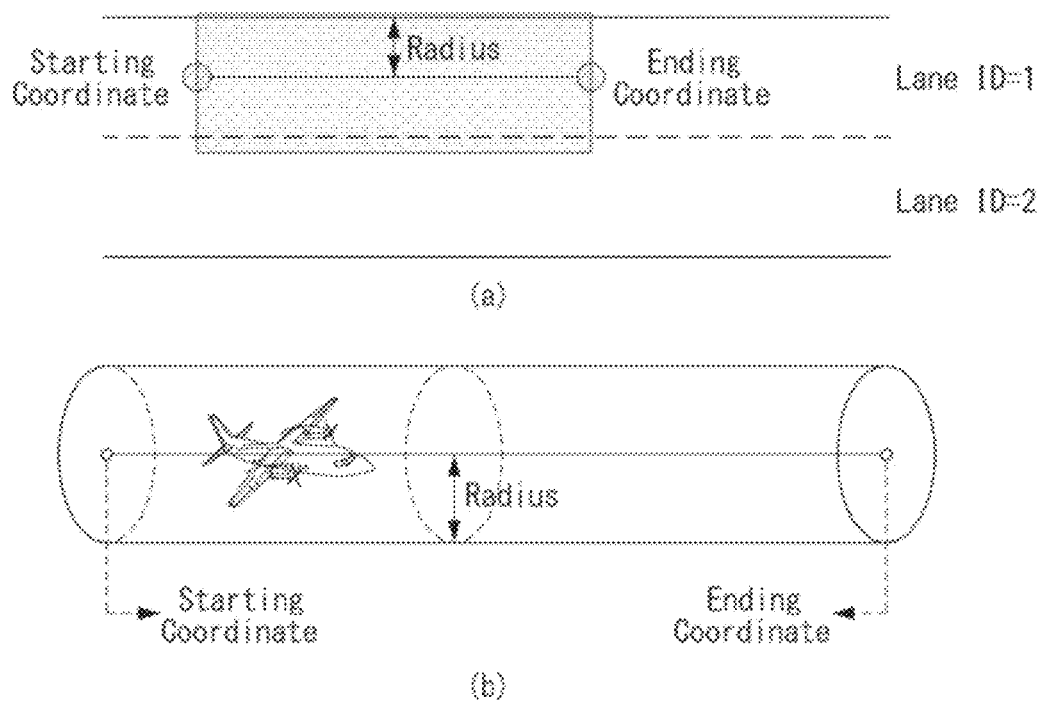
FIG. 17 is a diagram illustrating an example of a method for configuring two-dimensional or three-dimensional maneuver information according to an embodiment of the present disclosure.

FIG. 17 is a diagram illustrating an example of a method for configuring two-dimensional or three-dimensional maneuver information according to an embodiment of the present disclosure.

(a) in FIG. 17 exemplifies parameters included in coordinated maneuver information of a coordinator based on a two-dimensional maneuver, and (b) in FIG. 17 exemplifies parameters included in coordinated maneuver information applicable to three dimensions, when three-dimensional information is required as in an airplane or a drone.

Table 12 below exemplifies each field and parameters of a management message that the above-described coordinator transmits to control a driving operation of each reporter for an optimal driving operation based on an intended maneuver transmitted from each reporter.

TABLE 12

| Field | | Description |
|---|---|---|
| Maneuver List | | Can include one or more Straight Maneuver Segments |
| Straight Maneuver Segment | | |
| Starting Coordinate | | Coordinate of the starting position. It consists of the longitude, latitude, and altitude. |
| Ending Coordinate | | Coordinate of the ending position. It consists of the longitude, latitude, and altitude. |
| Radius | | Radius based on the straight line from the Starting Coordinate and Ending Coordinate |
| Time | Earliest | Earliest time in the geographical interval described by Starting Coordinate, Ending Coordinate, and Radius. |
| | Latest | Latest time in the geographical interval described by Starting Coordinate, Ending Coordinate, and Radius. |
| Heading | | Heading for the geographical interval described by Starting Coordinate, Ending Coordinate, and Radius. |
| Speed | Lowest | Lowest speed for the geographical interval described by Starting Coordinate, Ending Center Coordinate, and Radius. |
| | Highest | Highest speed for the geographical interval described by Starting Coordinate, Ending Coordinate, and Radius. |
| Acceleration | Lowest | Lowest acceleration for the geographical interval described by Starting Coordinate, Ending Coordinate, and Radius. |
| | Highest | Highest acceleration for the geographical interval described by Starting Coordinate, Ending Coordinate, and Radius. |

Based on intended maneuvers transmitted from reporters, a coordinator may generate a coordinated maneuver for an optimal driving operation and transmit the coordinated maneuver to each reporter, thereby enabling each reporter to perform an efficient driving operation.

For example, as illustrated in (a) of FIG. 17, a coordinator may transmit a management message to a reporter. The management message may include the following parameters: a starting coordinate that is a start point of driving on a single lane, an ending coordinate in which driving ends, and a radius field.

Alternatively, as illustrated in (b) of FIG. 17, when three-dimensional maneuver information is required as in an airplane or a drone, three-dimensional information may be generated based on an intended maneuver and be transmitted to each reporter.

Figure 18:
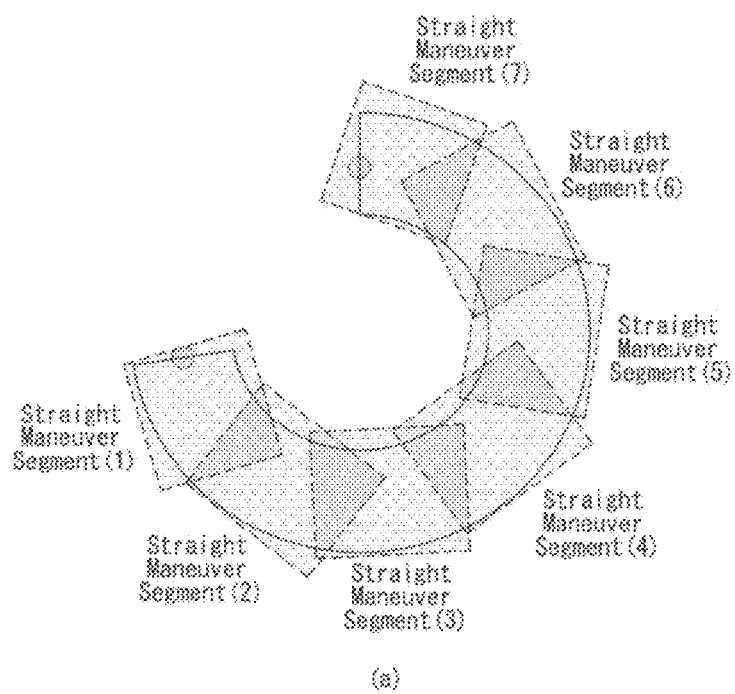
FIG. 18 is a diagram illustrating an example of a method for configuring maneuver information for a curved road according to an embodiment of the present disclosure.
Figure 18:
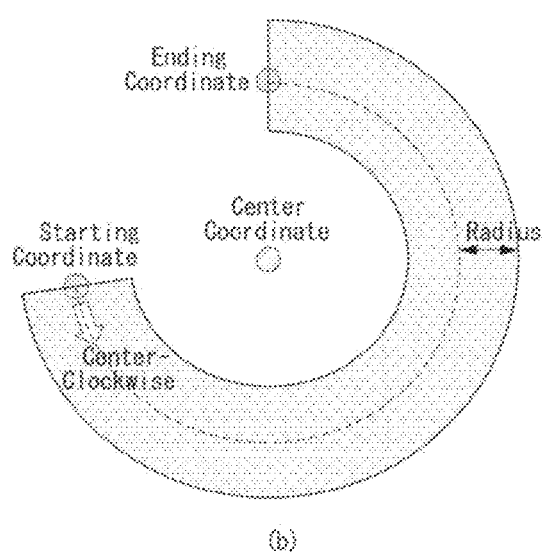

FIG. 18 is a diagram illustrating an example of a method for configuring maneuver information for a curved road according to an embodiment of the present disclosure.

Referring to FIG. 18, when a reporter or a coordinator wants to include information on a lane with a curve, the reporter or the coordinator may transmit the information by constructing the curve by straight segments, as illustrated in (a) of FIG. 18, or by including a start point, a radius, a center position and an end position in maneuver information or driving management information, as illustrated in (b) of FIG. 18.

Table 13 below shows an example of field format of maneuver information and/or driving management information for a lane including a curve.

TABLE 13

| Field | | Description |
|---|---|---|
| Maneuver List | | Can include one or more Curved Maneuver Segments |
| Curved Maneuver Segment | | |
| Starting Coordinate | | Coordinate of the starting position. It consists of the longitude, latitude, and altitude. |
| Ending Coordinate | | Coordinate of the ending position. It consists of the longitude, latitude, and altitude. |
| Radius | | Radius based on the straight line from the Starting Coordinate and Ending Coordinate |
| Center Coordinate | | Coordinate of the center position of the curved path having the two positions described by Starting Coordinate and Ending Coordinate. It consists of the longitude, latitude, and altitude. |
| Time | Earliest | Earliest time in the geographical interval described by Starting Coordinate, Ending Coordinate, and Radius. |
| | Latest | Latest time in the geographical interval described by Starting Coordinate, Ending Coordinate, and Radius. |
| Heading | | Heading for the geographical interval described by Starting Coordinate, Ending Coordinate, and Radius. It can be a simple indication of clockwise or counter-clockwise. |
| Speed | Lowest | Lowest speed for the geographical interval described by Starting Coordinate, Ending Center Coordinate, and Radius. |
| | Highest | Highest speed for the geographical interval described by Starting Coordinate, Ending Coordinate, and Radius. |
| Acceleration | Lowest | Lowest acceleration for the geographical interval described by Starting Coordinate, Ending Coordinate, and Radius. |
| | Highest | Highest acceleration for the geographical interval described by Starting Coordinate, Ending Coordinate, and Radius. |

Also, the following information and/or message may be additionally required for a coordinator to control driving of each reporter through a coordinated maneuver based on maneuver information transmitted from reporters.

The following additional information may be included in vehicle driving management information of a management message.

Priority

Priority information indicates priority values among reporters. A reporter with a higher priority value may respond to a coordinated maneuver. When there is a conflict with a reported maneuver, the reporter may have a shorter delay or waiting time than a reporter with a lower priority value.

Table 14 below shows an example of assigning priority values.

TABLE 14

| Priority value | Description |
|---|---|
| 0 | Emergency vehicle (e.g., fire truck, ambulance, . . . ) |
| 1 | Public transportation (e.g., Bus) |
| 2 | Vehicle with a disabled person on board |
| . . . | . . . |

Based on the above priority, priority of waiting time or operations may be set among reporters.

For example, as shown in Table 14, when priority is determined in the order of emergency vehicle, public transportation and vehicle with a disabled person on board, the emergency vehicle may have a shorter waiting time than other vehicles or perform a driving operation before other vehicles.

Figure 19:
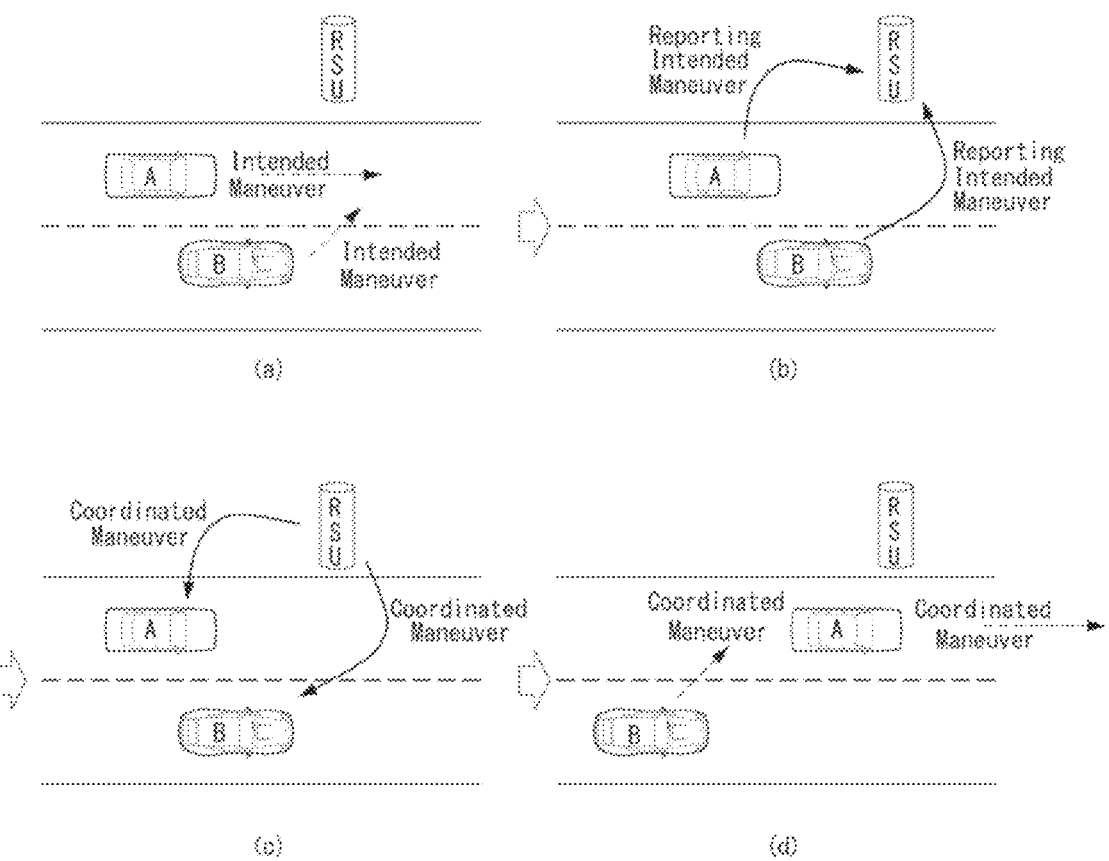
FIG. 19 is a diagram exemplifying a method in which a coordinator controls the driving of a vehicle based on the vehicle state according to an embodiment of the present disclosure.

FIG. 19 is a diagram exemplifying a method in which a coordinator controls the driving of a vehicle based on the vehicle state according to an embodiment of the present disclosure.

Referring to FIG. 19, according to an urgency or driving condition that reporters include in an intended maneuver, a driving order of reporter vehicles may be determined.

Specifically, as illustrated in FIG. 19, the reporter A intends to keep running on a single lane, and the reporter B intends to make a lane change into the lane on which the reporter A intends to keep running.

In this case, the reporter A and the reporter B transmit continuous single lane driving information and lane change information, both of which are intended maneuver information and are described in FIG. 14 and FIG. 15 respectively, to RSU that is a coordinator.

Herein, maneuvers that are transmitted by the reporter A and the reporter B respectively include information indicating urgency levels of the reporters or information indicating driving conditions.

When the coordinator determines that the reporter A should run before the reporter B based on the intended maneuvers transmitted from the reporter A and the reporter B, the coordinator coordinates the maneuvers so that the reporter A can run before the reporter B and then transmits the coordinated maneuvers to the reporter A and the reporter B.

For example, when the reporter A has higher urgency or a worse driving condition than the reporter B, the coordinator may coordinate maneuver information so that the reporter A can run before the reporter B.

When the reporter A and the reporter B receives a coordinated maneuver from the coordinator through a vehicle driving management message, the reporter A may run first according to the coordinated maneuver and then the reporter B may make a lane change into the lane of the reporter A.

Urgency information and driving condition information may be as follows.

Urgency

Urgency information shows how urgent a reported maneuver should be considered. When there is a conflict of maneuver between reporters (for example, when driving operations likely to cause a collision are intended by maneuvers), a reporter reporting a maneuver with higher urgency may receive a shorter delay or a shorter waiting time as a response from a coordinator than a reporter reporting a maneuver with lower urgency.

Urgency may be quantified as follows.

Reciprocal of a maximum distance that a maneuver reporter can run on a current lane or road.

A time left until a reporter reporting a maneuver is supposed to make a lane from a current lane or to move into another road.

Driving Condition

Driving condition information is information indicating a driver condition of a reporter reporting a maneuver. When intended maneuvers reported by reporters conflict with each other, a coordinate maneuver demanding more elaborate driving may be transmitted to a reporter driven by a driver with better driving condition rather than to a reporter driven by a driver with worse driving condition.

For example, since a reporter driven by a driver with normal condition may perform more elaborate driving than a reporter driven by a sleepy driver, when a lane change or continuous driving on a same lane is intended, the reporter driven by the driver with normal condition may run later than the reporter driven by the sleepy driver.

Table 15 below shows examples of driving condition values.

TABLE 15

| Driving Condition value | Description |
| --- | --- |
| 0 | unconscious |
| 1 | sleepy or drowsy |
| 2 | sick |
| 3 | normal |
| ... | ... |

In Table 15, the lower the driving condition value, the worse the driver's condition. A maneuver may be coordinated by RSU, that is, a coordinator so that a reporter with a low driving condition value can perform expected driving ahead of another reporter with a high driving condition value.

When receiving a maneuver that is coordinated by a coordinator, reporters may perform driving according to the coordinated maneuver.

Figure 20:
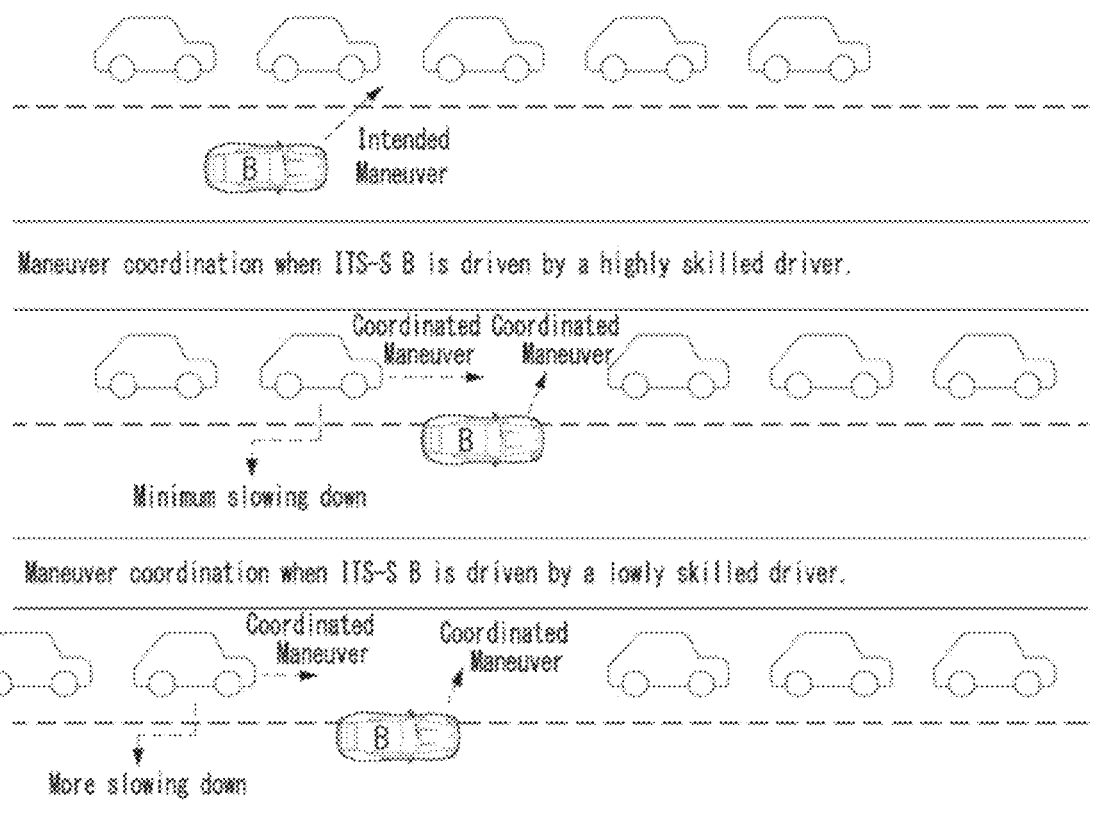
FIG. 20 is a diagram illustrating an example of a method for controlling a vehicle according to the driving skill of a vehicle in accordance with an embodiment of the present disclosure.

FIG. 20 is a diagram illustrating an example of a method for controlling a vehicle according to the driving skill of a vehicle in accordance with an embodiment of the present disclosure.

Referring to FIG. 20, maneuvers may be coordinated according to a driving skill-level included in intended maneuver information, and reporters' driving may be controlled according to a coordinated maneuver.

Specifically, as illustrated in FIG. 20, when the reporter B has to make a lane change, the speeds of reporters running on a lane, into which the reporter B is supposed to move, may be slowed so that the reporter B can make a lane change.

Driving Skill-Level

Driving skill-level information indicates driving skill-levels of reporters reporting maneuvers or the users of the reporters. When there is a conflict of maneuver between reporters (e.g., when driving operations likely to cause a collision are intended by maneuvers), a reporter reporting a higher driving skill-level may perform an operation requiring a more elaborate maneuver skill than a reporter reporting a lower driving skill-level.

Table 16 below shows examples of driving skill-levels.

TABLE 16

| Driving Skill-level value | Description |
| --- | --- |
| 0 | Novice (e.g., Period of driving experience is less than 1 year. Or the number of committed traffic accidents is more than 10 per year.) |
| 1 | Intermediate (e.g., Period of driving experience is more than 1 year and less than 5 years. Or the number of committed traffic accidents is less than 10 and more than 5 per year.) |
| 2 | Advanced (e.g., Period of driving experience is more than 5 years. Or the number of committed traffic accidents is less than 5 per year.) |
| ... | ... |

Auto-Driving Level

Auto-driving level information indicates a driving automation level of a reporter reporting a maneuver. When there is a conflict of maneuver between reporters, a reporter reporting a higher value of automation level may receive a coordinated maneuver requiring more automated driving skills than a reporter reporting a lower value of automation level.

Table 17 below shows examples of auto-driving levels.

TABLE 17

| Auto-driving level | Description |
| --- | --- |
| 0 | No driving automation |
| 1 | Driver assistance |
| 2 | Partial driving automation |
| 3 | Conditional driving automation |
| 4 | High driving automation |
| 5 | Full driving automation |

Supported Safety Applications

Supported safety application information indicates a type of V2X safety applications supported by a reporter reporting a maneuver. A coordinated maneuver may be determined based on a supported V2X safety application. Table 18 below shows examples of supported safety applications.

TABLE 18

| Supported safety applications | Description |
| --- | --- |
| 0 | Emergency vehicle warning |
| 1 | Slow vehicle indication |
| 2 | Intersection collision warning |
| 3 | Motorcycle approaching indication |
| 4 | Emergency electronic brake lights |
| 5 | Wrong way driving warning |
| 6 | Stationary vehicle-accident |
| 7 | Stationary vehicle-vehicle problem |
| 8 | Traffic condition warning |
| 9 | Signal violation warning |
| 10 | Roadwork warning |
| 11 | Collision risk warning |
| 12 | Enhanced route guidance and navigation |
| 13 | Limited access warning and detour notification |
| 14 | Fleet management |
| 15 | Loading zone management |
| . . . | . . . |

Waiting Time

Figure 21:
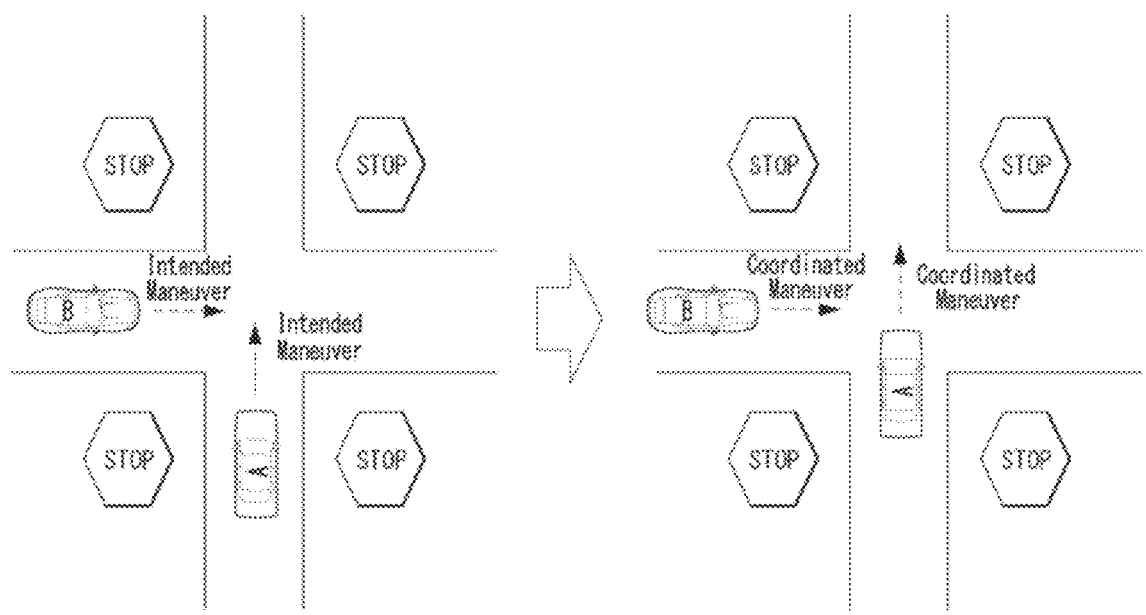
FIG. 21 is a diagram illustrating an example of a method for controlling a driving operation of a vehicle according to an embodiment of the present disclosure.

FIG. 21 is a diagram illustrating an example of a method for controlling a driving operation of a vehicle according to an embodiment of the present disclosure.

Referring to FIG. 21, a reporter may stop running, wait and then start running again based on a waiting time included in intended maneuver information or coordinated maneuver information.

Waiting time information mean a time in which reporters reporting intended maneuvers should wait at a cross or roundabout or in a place where several roads meet.

A reporter with a short waiting time may perform a driving operation ahead of a reporter with a long waiting time. However, when a reporter with a long waiting time has a higher priority value than a reporter with a short waiting time, the driving order may be determined based on the priority order.

For example, as illustrated in FIG. 21, when the reporter A has a shorter waiting time included in a coordinated maneuver than the reporter B, the reporter A may perform driving ahead of the reporter B at a cross or roundabout.

Queue Length

Figure 22:
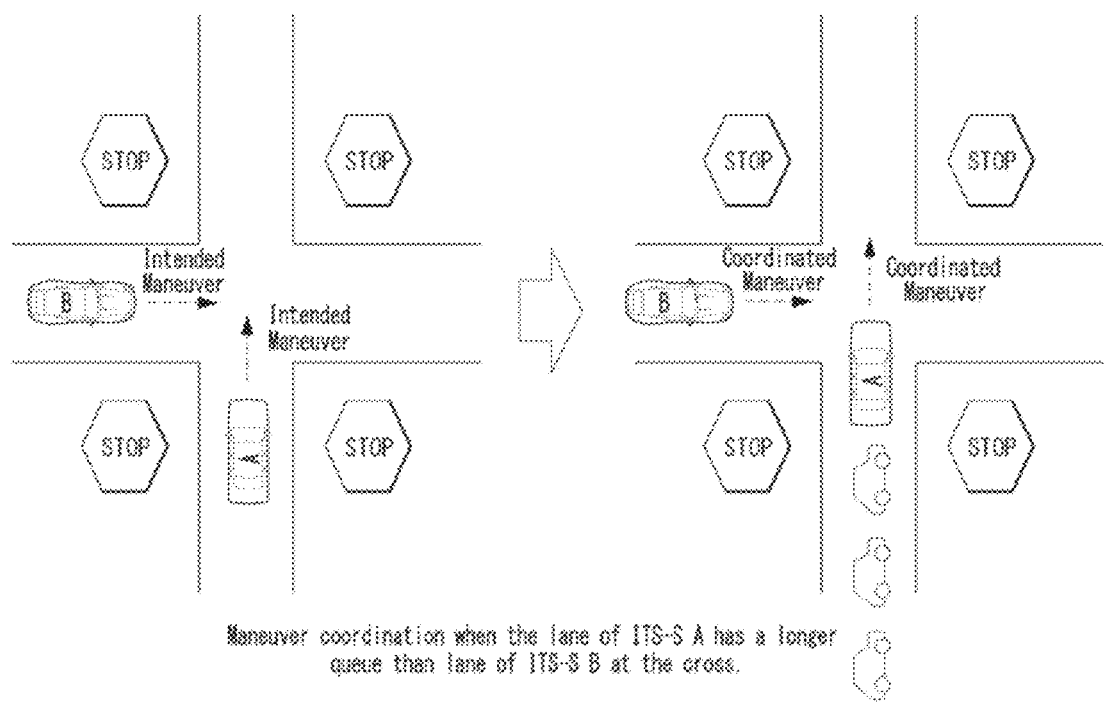
FIG. 22 is a diagram illustrating another example of a method for controlling a driving operation of a vehicle according to an embodiment of the present disclosure.

FIG. 22 is a diagram illustrating another example of a method for controlling a driving operation of a vehicle according to an embodiment of the present disclosure.

Referring to FIG. 22, a reporter may stop running, wait and then start running again based on a queue length included in intended maneuver information or coordinated maneuver information.

Specifically, indicating a queue length on a road, queue length information may mean a queue length on a lane or road where a reporter reporting a maneuver is running. When intended maneuvers reported by reporters conflict with each other, based on queue length information, a reporter reporting a maneuver of a lane or road having a longer queue may perform driving ahead of a reporter reporting a maneuver of a lane or road having a shorter queue.

That is, as illustrated in FIG. 22, based on intended maneuvers reported by the reporter A and the reporter B, a coordinator may determine the queue length of each lane. When the coordinator determine that the road of the reporter A has a longer queue, the coordinator may transmit vehicle driving management information including a coordinated maneuver to the reporter A and the reporter B. Thus, the coordinator may perform control so that the reporter A can run ahead of the reporter B.

Table 19 below shows examples of message formats including each piece of information that is described above.

TABLE 19

| Field | Description |
| --- | --- |
| Supplement Message | |
| Priority | Priority of the Maneuver Reporter. Integer (0 . . . 255) |
| Urgency | Reciprocal value of the maximum distance which a Maneuver Reporter can keep the current lane or road. Or, remaining time until a Maneuver Reporter should change its current lane or road. Integer (0 . . . 255) in second |
| Driving Skill Level | Driving Skill Level of the driver of the Maneuver Reporter. Integer (0 . . . 255) |
| Driver Condition | Condition of the driver of the Maneuver Reporter. Integer (0 . . . 255) |
| Auto-Driving Level | Level of driving automation of the Maneuver Reporter. Integer (0 . . . 255) |
| Supported Safety Applications | V2X safety applications supported by the Maneuver Reporter. Enumerated (0 . . . 255) |
| Waiting Time | Time duration which the Maneuver Reporter has been waiting for its turn. Integer (0 . . . 255) in second |
| Queue Length | Length of queue of the lane or road in which the Maneuver Reporter is driving. Integer (0 . . . 255) |

A message element of Table 19 may be included in a maneuver report message (or driving message) together with a description of an intended maneuver but is not necessarily included in a maneuver coordination message (or management message).

Figure 23:
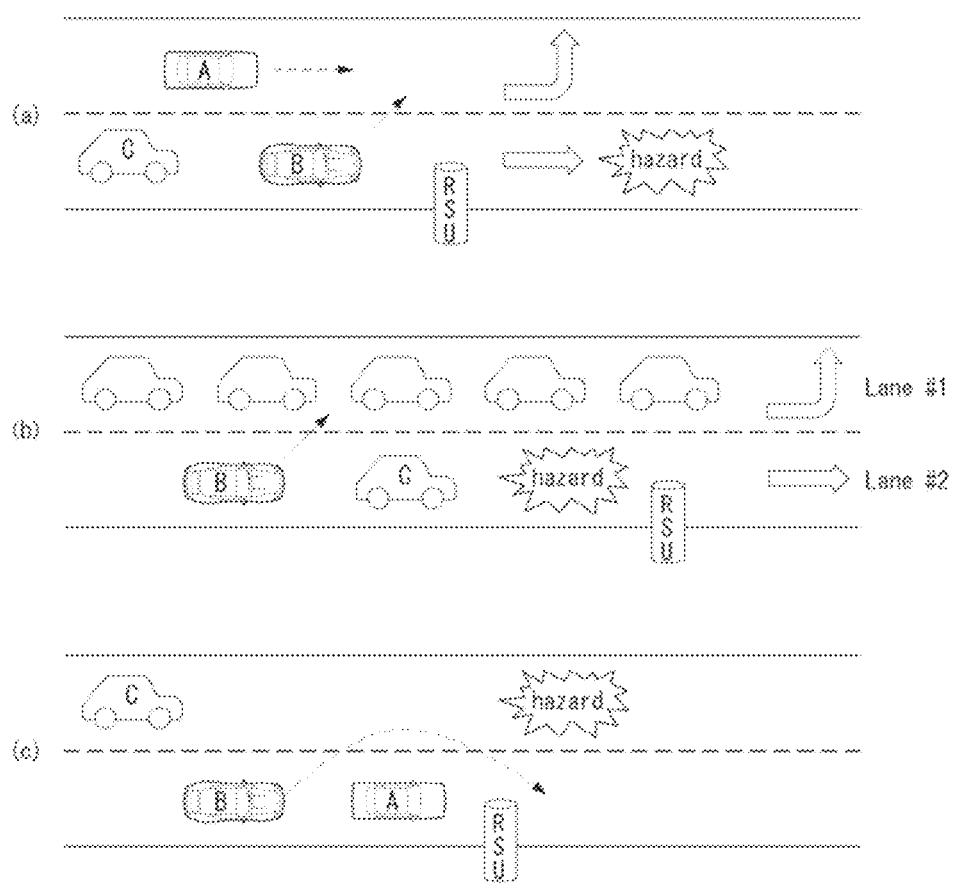
FIG. 23 is a diagram illustrating yet another example of a method for controlling a driving operation of a vehicle according to an embodiment of the present disclosure.

FIG. 23 is a diagram illustrating yet another example of a method for controlling a driving operation of a vehicle according to an embodiment of the present disclosure.

(a) in FIG. 23 exemplifies a lane change case in which a hazardous situation occurs, and (b) in FIG. 23 exemplifies a lane change case in which a plurality of vehicles is running on a single lane.

(c) in FIG. 23 illustrates a case in which overtaking a vehicle is attempted.

In the case of (a) of FIG. 23, the vehicle A has a plan of keeping the current lane for a while, and the vehicle B intends to make a lane change into the left lane. In this case, the vehicle A and the vehicle B include maneuver information, that is, their intended and expected driving information after the current time, in a driving message described in FIGS. 8 to 22 and transmit the message to ITS-S, that is, a coordinator through broadcasting, multicasting and unicasting.

Based on the driving information collected from the vehicles, the coordinator ITS-S determines and coordinates an optimal maneuver and transmits the coordinated maneuver to each vehicle.

Herein, the coordinator ITS-S may be the vehicle A, the vehicle B, the vehicle C or RSU.

When receiving the optimal coordinated maneuver from the coordinator, the vehicle A and the vehicle B may perform driving according to the coordinated maneuver.

In the case of (b) of FIG. 23, one or more vehicles (that is, a group of vehicles) have a plan of keeping their current lane (that is, Lane #1) for a while, and the vehicle B intends to do a lane change into the left lane and to be merged into the vehicle group.

In this case, the vehicle group on Lane #1 and the vehicle B transmit an intended maneuver described in FIGS. 8 to 22 to the coordinator ITS-S through a driving message by using a broadcasting method, a multicasting method or a unicasting method.

The coordinator ITS-S may be the vehicle B, the vehicle C, RSU or one in the vehicle group. The intended maneuver transmitted by the vehicle B and the vehicle group may be collected by the coordinator.

ITS-S may determine an optimal maneuver for the vehicle group and the vehicle B based on the collected maneuvers and transmit the determined maneuver to the vehicle B and the vehicle group through a management message. Thus, ITS-S may control the vehicles so that the vehicle B can make a lane change into the vehicle group.

This case is an example in which the vehicle B makes a lane change into the vehicle group. This case may be a special case of lane change.

In the case of (c) of FIG. 23, the vehicle A has a plan of keep the current lane at the current speed, and the vehicle B on the same lane has a plan of running faster on the lane. Alternatively, the vehicle B has a plan of overtaking the vehicle A and running faster than the vehicle A.

In this case, the vehicle A and the vehicle B transmit an intended maneuver described in FIGS. 8 to 22 to the coordinator ITS-S through a driving message by using a broadcasting method, a multicasting method or a unicasting method.

The coordinator ITS-S may be one of the vehicle A, the vehicle B, the vehicle C and RSU. The intended maneuver transmitted by the vehicle A and the vehicle B may be collected by the coordinator.

ITS-S may determine an optimal maneuver for the vehicle A and the vehicle B based on the collected maneuvers and transmit the determined maneuver to the vehicle A and the vehicle B through a management message. Thus, ITS-S may control the vehicles so that the vehicle B can overtake the vehicle A.

Figure 24:
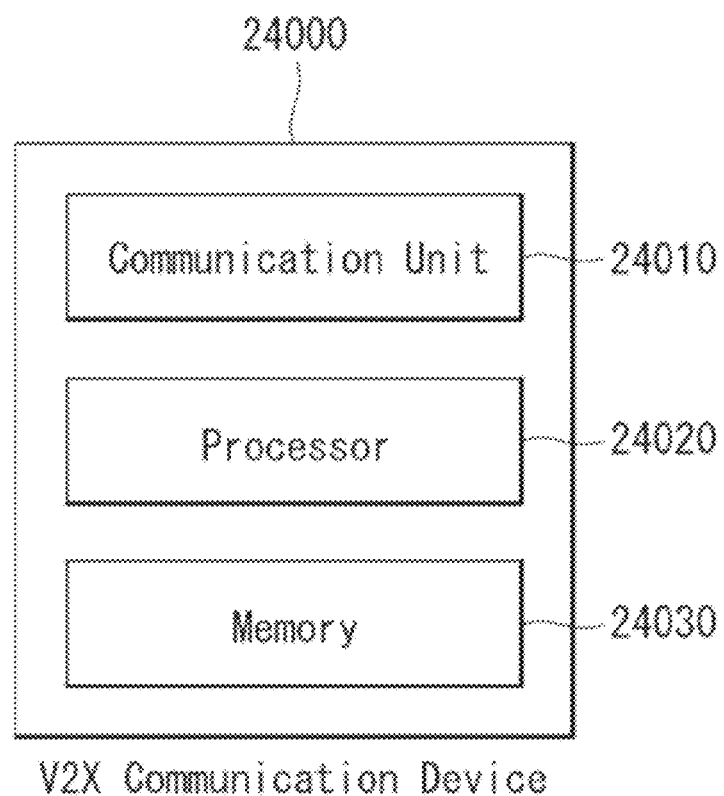
FIG. 24 illustrates a V2X communication device according to an embodiment of the present disclosure.

FIG. 24 illustrates a V2X communication device according to an embodiment of the present disclosure.

FIG. 24 illustrates a block diagram of a V2X communication device according to an embodiment of the present disclosure, wherein the hybrid V2X communication device may be referred to as a V2X communication device.

In FIG. 24, the V2X communication device 24000 may include a communication unit 24010, a processor 24020, and a memory 24030. As described above, the V2X communication device may be an OBU (On Board Unit) or an RSU (Road Side Unit), or may be included in an OBU or an RSU. The V2X communication device may be included in an ITS station or may correspond to the ITS station.

The communication unit 24010 may be connected to the processor 24020 to transmit/receive wireless signals or wired signals. The communication unit 24010 may upconvert the data received from the processor 24020 to a transmission/reception band and transmit a signal. The communication unit may implement an operation of an access layer. In one embodiment, the communication unit may implement an operation of a physical layer included in the access layer, or may further implement an operation of a MAC layer. The communication unit may include a plurality of subcommunication units for communicating in accordance with a plurality of communication protocols.

The processor 24020 may be coupled to the communication unit 24010 and implement the operation of the layers according to the ITS system or the WAVE system. The processor 24020 may be so configured to perform operations according to the foregoing drawings and description in various embodiments of the present disclosure. Also, at least one of a module, data, a program or software that implement the operation of the V2X communication device 24000 according to various embodiments of the present disclosure described above may be stored in the memory 24030 and be executed by the processor 24020.

The memory 24030 is connected to the processor 24020 and stores various data/information for driving the processor 24020. The memory 24030 may be included within the processor 24020 or may be installed outside the processor 24020 and be coupled to the processor 24020 by a known means. The memory may include a secure/non-secure storage device, or may be included in a secure/non-secure storage device. According to an embodiment, the memory may be referred to as a secure/non-secure storage device.

A specific configuration of the V2X communication device 24000 of FIG. 24 may be implemented such that the foregoing various embodiments of the present disclosure are applied independently or two or more of the embodiments are applied together.

In an embodiment of the present disclosure, the communication unit may include at least two transceivers. The communication unit may comprise a transceiver for performing communication according to the WLAN V2X communication protocol based on Institute of Electrical and Electronics Engineers (IEEE) 802.11 and a transceiver for performing communication according to a cellular V2X communication protocol based on LTE/E-UTRA (Evolved Universal Terrestrial Access) of 3GPP (3rd Generation Partnership Project) or 5G NR (New Radio). A transceiver that communicates in accordance with the WLAN V2X communication protocol, such as ITS-G5, may be referred to as a WLAN transceiver. A transceiver that communicates in accordance with a cellular communication protocol such as NR may be referred to as a cellular transceiver.

Figure 25:
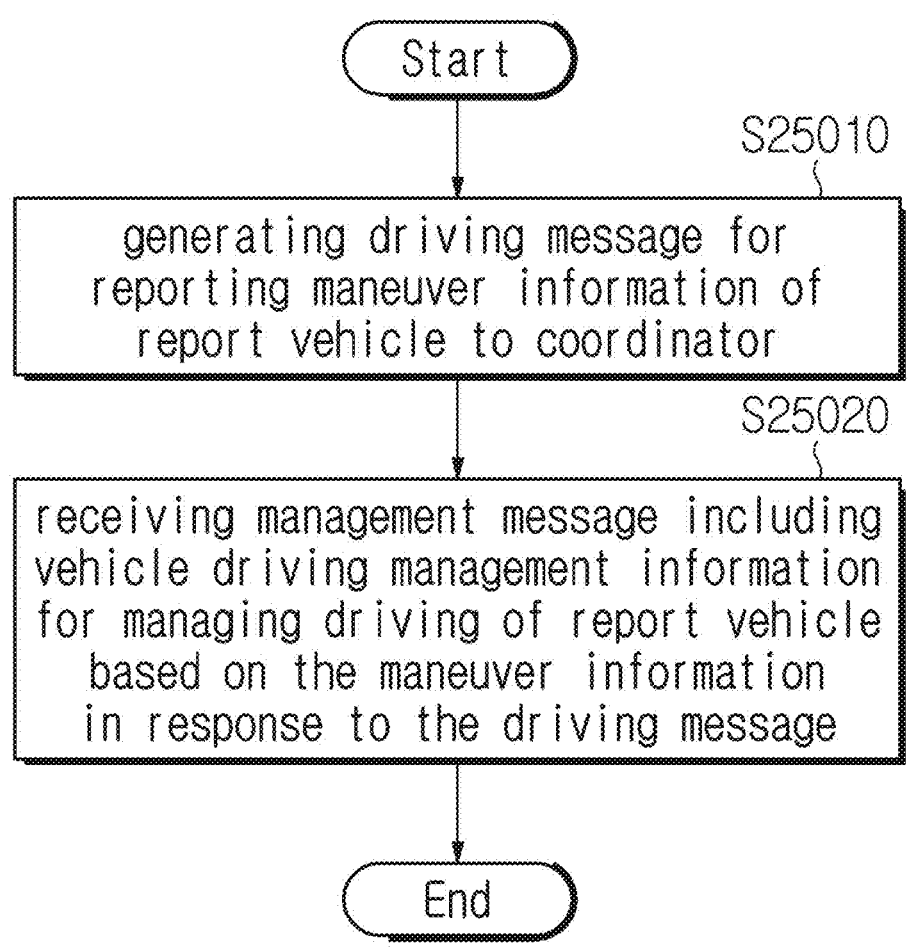
FIG. 25 exemplifies a method for transmitting a message for vehicle driving management according to an embodiment of the present disclosure.

FIG. 25 exemplifies a method for transmitting a message for vehicle driving management according to an embodiment of the present disclosure.

Specifically, a reporter generates a driving message to report the maneuver information of the reporting vehicle to a coordinator vehicle (S25010).

Herein, as described in FIG. 6, the driving message may be generated by collecting maneuver information associated with an intended driving operation after a current time of the reporter by each layer of the reporter. That is, the driving message may include the maneuver information associated with expected driving that is intended after the current time of the vehicle.

In addition, the maneuver information may include parameter values for notifying an intended driving operation of the reporter as described in FIGS. 14 to 23.

Next, the reporter receives a management message, as a response to the driving message, including vehicle driving management information for managing the driving operation of the reporting vehicle based on maneuver information (S25020).

Herein, the management message may include parameter values for controlling the driving of reporters described in FIGS. 14 to 23 and also include driving management information, that is, an optimal coordinated maneuver that is determined by extracting and collecting maneuvers of reporters by each layer of a coordinator, as described in FIG. 7.

Next, as described in FIGS. 8 to 23, a reporter may update an intended maneuver and perform a driving operation suitable to each situation according to the coordinated maneuver.

<Artificial Intelligence (AI)>

Artificial intelligence refers to the field of researching artificial intelligence or methodologies to create it, and machine learning refers to the field of researching methodologies to define and solve various problems dealt with in the field of artificial intelligence. Machine learning is also defined as an algorithm that improves the performance for a task through continuous experience associated with the task.

An artificial neural network (ANN) is a model used in machine learning, and may generally refer to a model with problem-solving capabilities, composed of artificial neurons (nodes) that form a network by combining synapses. The artificial neural network may be defined by a connection pattern between neurons of different layers, a learning process for updating model parameters, and an activation function for generating an output value.

The artificial neural network may include an input layer, an output layer, and optionally one or more hidden layers. Each layer includes one or more neurons, and the artificial neural network may include neurons and synapses connecting neurons. In an artificial neural network, each neuron may output function values of an activation function for input signals, weights, and biases that are input through synapses.

Model parameters refer to parameters determined through learning, and include weights of synaptic connections and biases of neurons. In addition, hyperparameters refer to parameters that must be set before learning in a machine learning algorithm, and include a learning rate, iteration count, mini-batch size, and initialization function.

The purpose of learning in an artificial neural network may be considered as determining a model parameter that minimizes a loss function. A loss function may be used as an index to determine an optimal model parameter in the learning process of an artificial neural network.

Machine learning may be classified into supervised learning, unsupervised learning and reinforcement learning according to the learning method.

Supervised learning refers to a method of training an artificial neural network when a label for training data is given, and a label may mean a correct answer (or result value) that the artificial neural network should infer when training data are input into the artificial neural network. Unsupervised learning may refer to a method of training an artificial neural network in a state where a label for training data is not given. Reinforcement learning may mean a learning method in which an agent defined in a certain environment learns to select an action or action sequence that maximizes the cumulative reward in each state.

Among artificial neural networks, machine learning implemented as a deep neural network (DNN) including a plurality of hidden layers is sometimes referred to as deep learning. The deep learning is a part of machine learning. Hereinafter, machine learning is used in the sense including deep learning.

<Robot>

A robot may refer to a machine that automatically processes or operates a task given by its own capabilities. In particular, a robot having a function of recognizing the environment and performing an operation based on its own determination may be referred to as an intelligent robot.

Robots may be classified into industrial robots, medical robots, household robots, and military robots, depending on the purpose or field of use.

The robot may be provided with a driving unit including an actuator or a motor to perform various physical operations such as moving a robot joint. In addition, a movable robot may include a wheel, a brake, a propeller, etc. in a driving unit, and may travel on the ground or fly in the air through the driving unit.

<Self-Driving or Autonomous-Driving>

Autonomous driving refers to self-driving technology, and autonomous driving vehicle refers to a vehicle that is driven without a user's manipulation or with a user's minimal manipulation.

For example, the autonomous driving may include all the following technologies: maintaining a driving lane, automatically adjusting the speed (e.g., adaptive cruise control), automatically driving along a specified route, and automatically setting a route when a destination is set.

The term "vehicle" may encompass not only all types of automobiles such as a vehicle having only an internal combustion engine, a hybrid vehicle equipped with both an internal combustion engine and an electric motor, and an electric vehicle having an electric motor alone but also trains and motorcycles.

Herein, the autonomous vehicle may be viewed as a robot having an autonomous driving function.

<Extended Reality (XR)>

The extended reality collectively refers to Virtual Reality (VR), Augmented Reality (AR), and Mixed Reality (MR). VR technology provides only CG images of real-world objects or backgrounds, AR technology provides virtually created CG images on top of real object images, and MR technology is a computer graphic technology of mixing and combining virtual objects with the real world.

MR technology is similar to AR technology in that it shows real objects and virtual objects together. However, in AR technology, virtual objects are used to complement real objects, whereas in MR technology, virtual objects and real objects are used with equal characteristics.

XR technology may be applied to HMD (Head-Mount Display), HUD (Head-Up Display), mobile phones, tablet PCs, laptops, desktops, TVs, digital signage, etc. Devices to which XR technology is applied may be referred to as XR devices.

Figure 26:
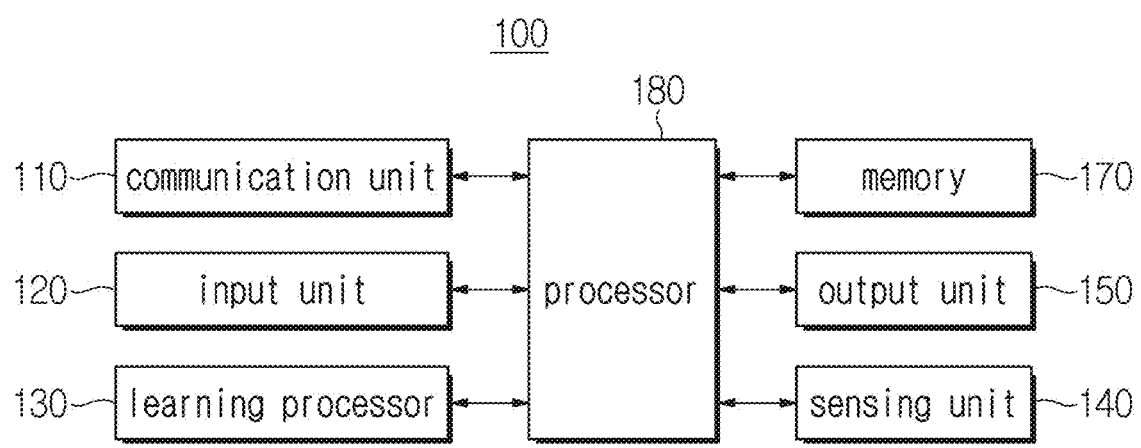

FIG. 26 shows an AI device 100 according to an embodiment of the present disclosure.

The AI device 100 may be implemented by the following fixed devices or mobile devices: a TV, a projector, a mobile phone, a smartphone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, a vehicle, and the like.

Referring to FIG. 26, the terminal 100 may include a communication unit 110, an input unit 120, a learning processor 130, a sensing unit 140, an output unit 150, a memory 170, and a processor 180.

The communication unit 110 may transmit and receive data with external devices such as other AI devices 100a to 100e or the AI server 200 using wired/wireless communication technology. For example, the communication unit 110 may transmit and receive sensor information, a user input, a learning model, and a control signal external device.

Herein, the communication technologies used by the communication unit 110 include Global System for Mobile communication (GSM), Code Division Multi Access (CDMA), Long Term Evolution (LTE), 5G, Wireless LAN (WLAN), Wireless-Fidelity (Wi-Fi), Bluetooth™ Radio Frequency Identification (RFID), Infrared Data Association (IrDA), ZigBee, and Near Field Communication (NFC).

The input unit 120 may obtain various types of data.

Herein, the input unit 120 may include a camera for inputting an image signal, a microphone for receiving an audio signal, and a user input unit for receiving information from a user. Herein, by treating a camera or a microphone as a sensor, a signal obtained from the camera or the microphone may be referred to as sensing data or sensor information.

The input unit 120 may obtain training data for model training and input data to be used when obtaining an output by using the training model. The input unit 120 may obtain unprocessed input data. In this case, the processor 180 or the learning processor 130 may extract an input feature as a preprocess for the input data.

The learning processor 130 may train a model composed of an artificial neural network using the training data. Here, the learned artificial neural network may be referred to as a learning model. The learning model may be used to infer a result value for new input data other than the training data, and the inferred value may be used as a basis for a decision to perform a certain operation.

In this case, the learning processor 130 may perform AI processing together with the learning processor 240 of the AI server 200.

In this case, the learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 may obtain at least one of internal information of the AI device 100, information on the surrounding environment of the AI device 100, and user information by using various sensors.

Herein, the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, etc.

The output unit 150 may generate output related to sight, hearing or touch.

Herein, the output unit 150 may include a display unit for outputting visual information, a speaker for outputting auditory information, and a haptic module for outputting tactile information.

The memory 170 may store data supporting various functions of the AI device 100. For example, the memory 170 may store input data, training data, a learning model, and a learning history obtained from the input unit 120.

The processor 180 may determine at least one executable operation of the AI device 100 based on information determined or generated using a data analysis algorithm or a machine learning algorithm. Further, the processor 180 may perform the determined operation by controlling the components of the AI device 100.

To this end, the processor 180 may request, search, receive, or utilize data from the learning processor 130 or the memory 170 and control the components of the AI device 100 to perform a predicted or desirable operation among the at least one executable operation and the like.

In this case, when connection of an external device is required to perform the determined operation, the processor 180 may generate a control signal for controlling the external device and transmit the generated control signal to the external device.

The processor 180 may obtain intention information for a user input, and determine a user's requirement based on the obtained intention information.

Herein, the processor 180 may obtain intention information corresponding to the user input by using at least one of a Speech To Text (STT) engine for converting a speech input into a character string and a Natural Language Processing (NLP) engine for obtaining intention information of a natural language.

Herein, at least one or more of the STT engine and the NLP engine may at least partially comprise an artificial neural network that is trained according to a machine learning algorithm. In addition, at least one of the STT engine and the NLP engine is learned by the learning processor 130, learned by the learning processor 240 of the AI server 200, or learned by distributed processing thereof.

The processor 180 may collect history information including user feedback on the operation content or operation of the AI device 100 and store the information in the memory 170 or the learning processor 130 or transmit the information to an external device like the AI server 200. The collected history information may be used to update the learning model.

The processor 180 may control at least some of the components of the AI device 100 to drive an application program stored in the memory 170. Furthermore, the processor 180 may operate by combining two or more of the components included in the AI device 100 to drive the application program.

Figure 27:
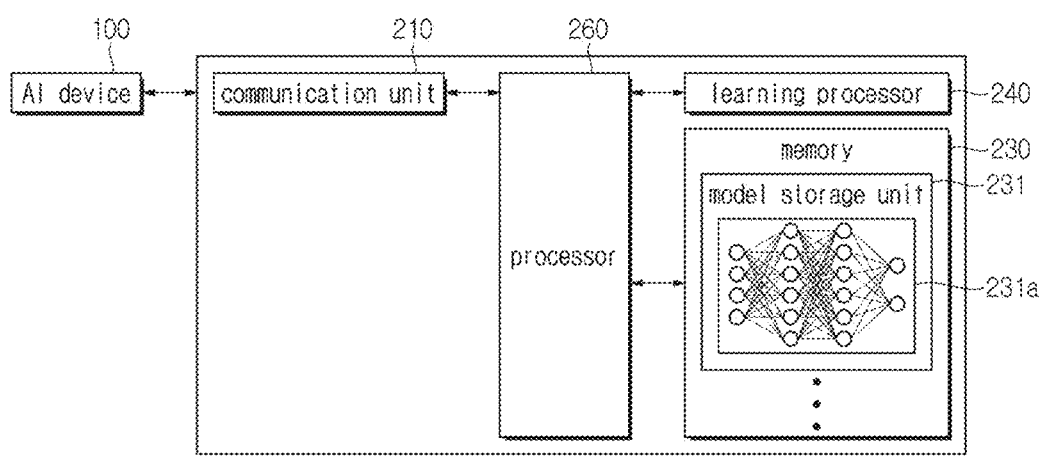

FIG. 27 shows an AI device 200 according to an embodiment of the present disclosure.

Referring to FIG. 27, the AI server 200 may refer to a device that trains an artificial neural network using a machine learning algorithm or uses the learned artificial neural network. Herein, the AI server 200 may be composed of a plurality of servers to perform distributed processing or may be defined as a 5G network. Herein, the AI server 200 may be included as a part of the AI device 100 to perform at least part of AI processing together.

The AI server 200 may include a communication unit 210, a memory 230, a learning processor 240, and a processor 260.

The communication unit 210 may transmit and receive data with an external device such as the AI device 100.

The memory 230 may include a model storage unit 231. The model storage unit 231 may store a model (or artificial neural network, 231a) being trained or trained through the learning processor 240.

The learning processor 240 may train the artificial neural network 231a using the training data. The learning model may be used by being mounted on the AI server 200 of the artificial neural network or may be used by being mounted on an external device such as the AI device 100.

The learning model may be implemented in hardware, software, or a combination of hardware and software. When a part or all of the learning model is implemented in software, one or more instructions constituting the learning model may be stored in the memory 230.

The processor 260 may infer a result value for new input data using the learning model and generate a response or a control command based on the inferred result value.

Figure 28:
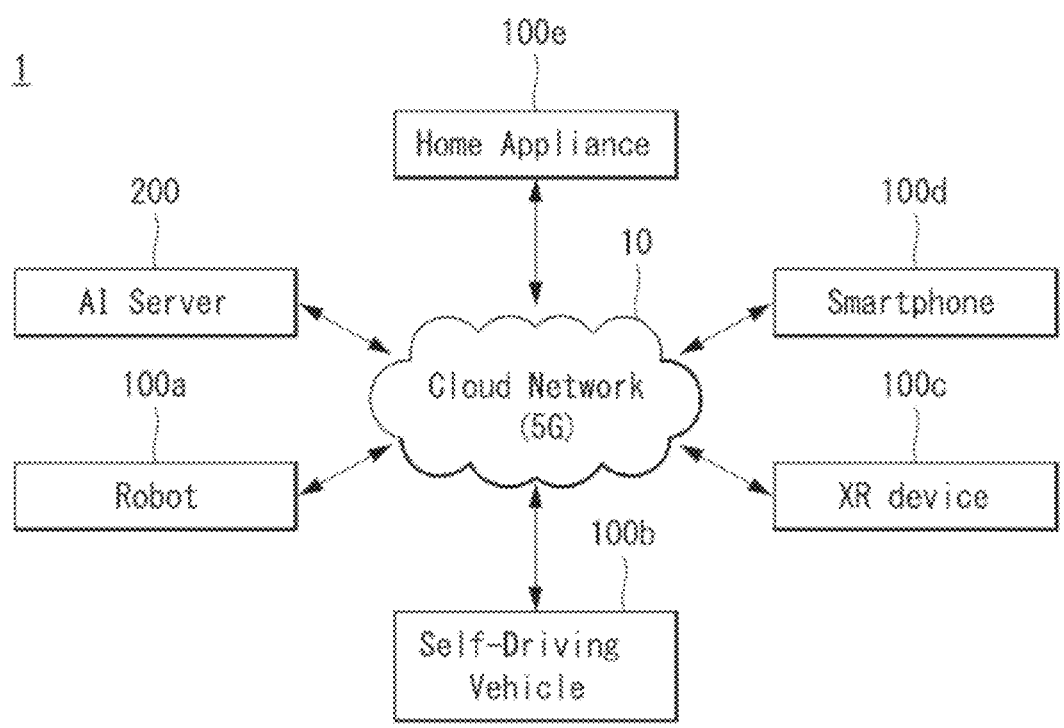

FIG. 28 shows an AI system 1 according to an embodiment of the present disclosure.

Referring to FIG. 28, in the external device AI system 1, at least one of an AI server 200, a robot 100a, an autonomous vehicle 100b, an XR device 100c, a smartphone 100d and a home appliance 100e is connected to the cloud network 10. Herein, the robot 100a to which the AI technology is applied, the autonomous vehicle 100b, the XR device 100c, the smartphone 100d, or the home appliance 100e may be referred to as the AI devices 100a to 100e.

The cloud network 10 may constitute a part of the cloud computing infrastructure or may mean a network that exists in the cloud computing infrastructure. Herein, the cloud network 10 may be configured using a 3G network, a 4G, a Long Term Evolution (LTE) network or a 5G network.

That is, the devices 100a to 100e and 200 constituting the AI system 1 may be connected to each other through the cloud network 10. In particular, the devices 100a to 100e and 200 may communicate with each other through a base station and may also communicate with each other directly without through a base station.

The AI server 200 may include a server that performs AI processing and a server that performs an operation on big data.

The AI server 200 may be connected to at least one of a robot 100a, an autonomous vehicle 100b, an XR device 100c, a smartphone 100d and a home appliance 100e, which are AI devices constituting the AI system 1, through the cloud network 10 and help at least partially the AI processing of the connected AI devices 100a to 100e.

In this case, the AI server 200 may train an artificial neural network according to a machine learning algorithm in place of the AI devices 100a to 100e, and may directly store the learning model or transmit it to the AI devices 100a to 100e.

Herein, the AI server 200 may receive input data from the AI devices 100a to 100e, infer a result value for the received input data using a learning model, generate a response or control command based on the inferred result value and transmit the response or control command to the AI devices 100a to 100e.

Alternatively, the AI devices 100a to 100e may infer a result value of input data by directly using a learning model and generate a response or a control command based on the inferred result value.

Hereinafter will be described various embodiments of the AI devices 100a to 100e to which the above-described technology is applied. Here, the AI devices 100a to 100e illustrated in FIG. 3 may be viewed as a specific embodiment of the AI device 100 illustrated in FIG. 1

<AI+Robot>

The robot 100a is applied with AI technology and may be implemented as a guide robot, a transport robot, a cleaning robot, a wearable robot, an entertainment robot, a pet robot, an unmanned flying robot, and the like.

The robot 100a may include a robot control module for controlling an operation, and the robot control module may refer to a software module or a chip implementing the same as hardware.

The robot 100a may obtain status information of the robot 100a by using sensor information obtained from various types of sensors, detect (recognizes) the surrounding environment and objects, generate map data, determine a travel route and a driving plan, decide a response to user interaction, or determine an action.

Herein, the robot 100a may use sensor information obtained from at least one sensor among a lidar, a radar and a camera in order to determine a travel route and a driving plan.

The robot 100a may perform the above-described operations using a learning model composed of at least one artificial neural network. For example, the robot 100a may recognize a surrounding environment and an object using a learning model, and may determine an operation using the recognized surrounding environment information or object information. Herein, the learning model may be directly learned by the robot 100a or learned by an external device such as the AI server 200.

Herein, the robot 100a may directly use a learning model to generate a result and perform an operation. However, the robot 100a may also transmit sensor information to an external device such as the AI server 200 and performs the operation by receiving the result generated accordingly.

The robot 100a may determine a travel route and a driving plan by using at least one of map data, object information detected from sensor information, or object information obtained from an external device. The robot 100a may be driven according to the determined travel route and the driving plan by controlling the driving unit.

The map data may include object identification information on various objects arranged in a space in which the robot 100a moves. For example, the map data may include object identification information on fixed objects such as walls and doors and movable objects such as flower pots and desks. In addition, the object identification information may include a name, a type, a distance, and a location.

In addition, the robot 100a may perform an operation or run by controlling a driving unit based on a user's control/interaction. Herein, the robot 100a may obtain intention information of interaction according to a user's motion or voice speech and determine a response based on the obtained intention information to perform an operation.

<AI+Autonomous Driving>

The autonomous vehicle 100b may be implemented as a mobile robot, vehicle or unmanned aerial vehicle by applying AI technology.

The autonomous driving vehicle 100b may include an autonomous driving control module for controlling an autonomous driving function, and the autonomous driving control module may refer to a software module or a chip implementing the same as hardware. The autonomous driving control module may be included in a configuration of the autonomous driving vehicle 100b but may also be configured as separate hardware and connected to the autonomous driving vehicle 100b from outside.

The autonomous driving vehicle 100b may obtain status information of the autonomous driving vehicle 100b by using sensor information obtained from various types of sensors, detect (recognize) the surrounding environment and objects, generate map data and determine a travel route, a driving plan and an operation.

Herein, like the robot 100*a*, the autonomous vehicle 100*b* may use sensor information obtained from at least one sensor among a lidar, a radar and a camera in order to determine a travel route and a driving plan.

In particular, the autonomous vehicle 100*b* may recognize an environment or object in an area where the view is obscured or an area greater than a certain distance by receiving sensor information from external devices, or receive information that is directly recognized information by external devices.

The autonomous vehicle 100*b* may perform the above-described operations using a learning model composed of at least one artificial neural network. For example, the autonomous vehicle 100*b* may recognize the surrounding environment and an object using a learning model, and may determine a driving route using the recognized surrounding environment information or object information. Herein, the learning model may be directly learned by the autonomous vehicle 100*b* or learned by an external device such as the AI server 200.

Herein, the autonomous vehicle 100*b* may directly use a learning model to generate a result and perform an operation. However, the autonomous vehicle 100*b* may also transmit sensor information to an external device such as the AI server 200 and perform the operation by receiving the result generated accordingly.

The autonomous vehicle 100*b* may determine a travel route and a driving plan by using at least one of map data, object information detected from sensor information, or object information obtained from an external device. The autonomous vehicle 100*b* may be driven according to the determined travel route and the driving plan by controlling the driving unit.

The map data may include object identification information on various objects arranged in a space (e.g., road) where the autonomous vehicle 100*b* runs. For example, the map data may include object identification information on fixed objects such as street lights, rocks and buildings and movable objects such as vehicles and pedestrians. In addition, the object identification information may include a name, a type, a distance, and a location.

In addition, the autonomous vehicle 100*b* may perform an operation or run by controlling a driving unit based on a user's control/interaction. Herein, the autonomous vehicle 100*b* may obtain intention information of interaction according to a user's motion or voice speech and determine a response based on the obtained intention information to perform an operation.

<AI+XR>

The XR device 100*c* is applied with AI technology and may be implemented as a head-mount display (HMD), a head-up display (HUD) provided in the vehicle, a TV, a mobile phone, a smart phone, a computer, a wearable device, a home appliance, a digital signage, a vehicle, a fixed robot or a mobile robot.

The XR device 100*c* may analyze 3D point cloud data or image data obtained through various sensors or from an external device to generate location data and attribute data for 3D points. Thus, the XR device 100*c* may obtain information on surrounding spaces or real objects and produce an output by rendering an XR object. For example, the XR device 100*c* may output an XR object including additional information on the recognized object by matching the XR object with the recognized object.

The XR device 100*c* may perform the above-described operations using a learning model composed of at least one artificial neural network. For example, the XR device 100*c* may recognize a real object from 3D point cloud data or image data by using a learning model, and may provide information corresponding to the recognized real object. Herein, the learning model may be directly learned by the XR device 100*c* or learned by an external device such as the AI server 200.

Herein, the XR device 100*c* may directly use a learning model to generate a result and perform an operation. However, the robot 100*a* may also transmit sensor information to an external device such as the AI server 200 and performs the operation by receiving the result generated accordingly.

<AI+Robot+Autonomous Driving>

The robot 100*a* may be implemented as a guide robot, a transport robot, a cleaning robot, a wearable robot, an entertainment robot, a pet robot, an unmanned flying robot, and the like by applying AI technology and autonomous driving technology.

The robot 100*a* to which AI technology and autonomous driving technology are applied may refer to a robot itself having an autonomous driving function or a robot 100*a* interacting with the autonomous driving vehicle 100*b*.

The robot 100*a* having an autonomous driving function may collectively refer to devices that move by themselves according to a given movement line without the user's control or by determining the movement line by themselves.

The robot 100*a* having an autonomous driving function and the autonomous driving vehicle 100*b* may use a common sensing method to determine one or more of a moving route or a driving plan. For example, the robot 100*a* having an autonomous driving function and the autonomous driving vehicle 100*b* may determine one or more of a movement route or a driving plan by using information sensed through a lidar, a radar, and a camera.

The robot 100*a* interacting with the autonomous driving vehicle 100*b* exists separately from the autonomous driving vehicle 100*b* and may be linked to an autonomous driving function inside or outside the autonomous driving vehicle 100*b* or may perform an operation associated with the user on board.

Herein, the robot 100*a* interacting with the autonomous driving vehicle 100*b* obtains sensor information on behalf of the autonomous driving vehicle 100*b* and provides the information to the autonomous driving vehicle 100*b* or obtains sensor information, generates information on the surrounding environment or object and provides the information to the autonomous vehicle 100*b*. Thus, the robot 100*a* may control or assist the autonomous driving function of the autonomous driving vehicle 100*b*.

Alternatively, the robot 100*a* interacting with the autonomous vehicle 100*b* may monitor a user in the autonomous vehicle 100*b* or control the functions of the autonomous vehicle 100*b* through interaction with the user. For example, when it is determined that the driver is in a drowsy state, the robot 100*a* may activate an autonomous driving function of the autonomous driving vehicle 100*b* or assist the control of a driving unit of the autonomous driving vehicle 100*b*. Herein, the functions of the autonomous vehicle 100*b* controlled by the robot 100*a* may include not only the autonomous driving function but also other functions provided by a navigation system or an audio system provided inside the autonomous driving vehicle 100*b*.

Alternatively, the robot 100*a* interacting with the autonomous driving vehicle 100*b* may provide information or assist a function from outside the autonomous driving vehicle 100b. For example, the robot 100a, like a smart traffic light, may provide traffic information including signal information to the autonomous vehicle 100b, or like an automatic electric charger of electric vehicle, may interact with the autonomous driving vehicle 100b to automatically connect an electric charger to the charging port.

<AI+Robot+XR>

The robot 100a may be implemented as a guide robot, a transport robot, a cleaning robot, a wearable robot, an entertainment robot, a pet robot, an unmanned flying robot, and the like by applying AI technology and XR technology.

The robot 100a to which the XR technology is applied may refer to a robot that is an object of control/interaction in an XR image. In this case, the robot 100a is distinguished from the XR device 100c and may be interlocked with each other.

When the robot 100a, which is the object of control/interaction in the XR image, obtains sensor information from sensors including a camera, the robot 100a or the XR device 100c may generate an XR image based on the sensor information, and the XR device 100c may output the generated XR image. In addition, the robot 100a may operate based on a control signal input through the XR device 100c or a user's interaction.

For example, the user may check the XR image corresponding to the viewpoint of the robot 100a linked remotely through an external device such as the XR device 100c, adjust the autonomous driving path of the robot 100a through the interaction, control motion or driving or identify information on surrounding objects.

<AI+Autonomous+XR>

The autonomous vehicle 100b may be implemented as a mobile robot, a vehicle or an unmanned aerial vehicle by applying AI technology and XR technology.

The autonomous driving vehicle 100b to which the XR technology is applied may refer to an autonomous driving vehicle equipped with a means for providing an XR image or an autonomous driving vehicle that is an object of control/interaction within the XR image. In particular, the autonomous vehicle 100b, which is an object of control/interaction within the XR image, may be distinguished from and be interlocked with the XR device 100c.

The autonomous vehicle 100b provided with a means for providing an XR image may obtain sensor information from sensors including a camera and output an XR image generated based on the acquired sensor information. For example, the autonomous vehicle 100b may be equipped with HUD and output an XR image. Thus, the autonomous vehicle 100b may provide an occupant with an XR object corresponding to a real object or an object in a screen.

In this case, when the XR object is output to the HUD, at least a part of the XR object may be output to overlap the actual object facing the occupant's gaze. On the other hand, when the XR object is output on a display provided inside the autonomous vehicle 100b, at least a part of the XR object may be output to overlap an object in the screen. For example, the autonomous vehicle 100b may output XR objects corresponding to objects such as lanes, other vehicles, traffic lights, traffic signs, motorcycles, pedestrians, and buildings.

When the autonomous vehicle 100b, which is the object of control/interaction in the XR image, obtains sensor information from sensors including a camera, the autonomous vehicle 100b or the XR device 100c may generate an XR image based on the sensor information, and the XR device 100c may output the generated XR image. In addition, the robot 100a may operate based on a control signal input through an external device like the XR device 100c or a user's interaction.

In the present specification, a wireless device may be a base station, a network node, a transmitting terminal, a receiving terminal, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, a MTC device, an IoT device, a medical device, a fintech device (or financial device), a security device, a climate/environmental device, or any other device associated with the fourth industrial revolution or the 5G service. For example, an UAV may be a flying object that carries no person but flies by radio control signals. For example, an MTC device and an IoT device are devices that do not require direct human intervention or manipulation, and may be smart meters, bending machines, thermometers, smart bulbs, door locks, and various sensors. For example, a medical device is a device used for diagnosing, treating, reducing, treating or preventing a disease or a device used for examining, replacing or modifying a structure or function. Such a medical device may be medical equipment, a surgical device, a (in vitro) diagnostic device, a hearing aid, a surgical device, and the like. For example, a security device is a device installed to prevent a probable risk and to maintain safety, and may be a camera, CCTV, black box, or the like. For example, a fintech device is a device capable of providing financial services such as mobile payment and may be a payment device, point of sales (POS), or the like. For example, a climate/environmental device may mean a device for monitoring and predicting the climate/environment.

In the present specification, a terminal may include a mobile phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a smartwatch, a smart glass, and a head mounted display (HMD)), a foldable device. For example, an HMD is a head-mounted display device and may be used to implement VR or AR.

In the embodiments described above, the components and features of the present disclosure are combined in a predetermined form. Each component or feature should be considered optional unless stated otherwise. Each component or feature may be implemented without being combined with other components or features. It is also possible to configure an embodiment of the present disclosure by combining some components and/or features. The order of the operations described in the embodiments of the present disclosure may be changed. Some configurations or features of one embodiment may be included in other embodiments or be replaced by corresponding configurations or features of other embodiments. It is apparent that claims having no explicit citation relationship in the claims may be combined to form an embodiment or to be included as a new claim by amendment after filing.

Embodiments according to the present disclosure may be implemented by various means, for example, hardware, firmware, software, or a combination thereof. In the case of implementation by hardware, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like may be used for implementation.

In the case of implementation by firmware or software, an embodiment of the present disclosure may be implemented in the form of a module, procedure, function, etc. that perform the functions or operations described above. The software code may be stored in memory and driven by a processor. The memory may be located inside or outside the processor and exchange data with the processor by various means already known.

It will be apparent to those skilled in the art that the present disclosure may be embodied in other specific forms without departing from the essential features of the present disclosure. Therefore, the above detailed description should not be construed as limiting in all respects and should be considered illustrative. The scope of the invention should be determined by rational interpretation of the appended claims, and all changes within the equivalent scope of the present disclosure are included in the scope of the present disclosure.

What is claimed is:

1. A method performed by a reporting vehicle, the method comprising:
    generating a driving message for reporting maneuver information of the reporting vehicle to a coordinator; and
    receiving a management message comprising vehicle driving management information for managing a driving operation of the reporting vehicle based on the maneuver information as a response to the driving message,
    wherein the driving message comprises the maneuver information associated with intended expected driving after a current time of the vehicle, and
    wherein the vehicle driving management information comprises indication information representing permission or rejection of an operation of the reporting vehicle according to the maneuver information, a maneuver type indicating a driving type of each vehicle for optimal driving of a plurality of vehicle managed by the coordinator, and driving information associated with driving according to the maneuver type.

2. The method of claim 1,
    wherein the maneuver information comprises at least one of specific information, geographic information, time information and dynamic information that are associated with the expected driving of the vehicle.

3. The method of claim 2,
    wherein the specific information, the geographic information, the time information and the dynamic information are collected through a maneuver collection function of a maneuver management application entity or a facility entity.

4. The method of claim 1 further comprises updating the maneuver information based on the vehicle driving management information.

5. The method of claim 1 further comprises performing a specific driving operation associated with the driving of the vehicle according to the driving management information.

6. The method of claim 1,
    wherein the maneuver information comprises a maneuver type indicating a type of the expected driving of the reporting vehicle and driving information associated with driving according to the maneuver type.

7. A reporting vehicle, the vehicle comprising:
    a radio frequency (RF) module for transmitting and receiving a wireless signal; and
    a processor functionally connected to the RF module,
    wherein the processor generates a driving message for reporting maneuver information of the reporting vehicle to a coordinator vehicle and receives a management message comprising vehicle driving management information for managing a driving operation of the reporting vehicle based on the maneuver information as a response to the driving message, and
    wherein the driving message comprises the maneuver information associated with intended expected driving after a current time of the vehicle, and
    wherein the vehicle driving management information comprises indication information representing permission or rejection of an operation of the reporting vehicle according to the maneuver information, a maneuver type indicating a driving type of each vehicle for optimal driving of a plurality of vehicle managed by the coordinator, and driving information associated with driving according to the maneuver type.

8. The vehicle of claim 7,
    wherein the maneuver information comprises at least one of specific information, geographic information, time information and dynamic information that are associated with the expected driving of the vehicle.

9. The vehicle of claim 8,
    wherein the specific information, the geographic information, the time information and the dynamic information are collected through a maneuver collection function of a maneuver management application entity or a facility entity.

10. The vehicle of claim 7,
    wherein the processor updates the maneuver information based on the vehicle driving management information.

11. The vehicle of claim 7,
    wherein the processor performs a specific driving operation associated with the driving of the vehicle according to the driving management information.

12. The vehicle of claim 7,
    wherein the maneuver information comprises a maneuver type indicating a type of the expected driving of the reporting vehicle and driving information associated with driving according to the maneuver type.

* * * * *